United States Patent Office 3,301,783
Patented Jan. 31, 1967

3,301,783
LUBRICATING COMPOSITION
Woodrow J. Dickson, La Habra, and Fred W. Jenkins, Buena Park, Calif., assignors to Petrolite Corporation, Wilmington, Del., a corporation of Delaware
No Drawing. Original application Aug. 4, 1960, Ser. No. 47,387. Divided and this application June 9, 1961, Ser. No. 115,878
32 Claims. (Cl. 252—47.5)

This application is a division of application Serial No. 47,387, filed on August 4, 1960, now withdrawn as an application, and is copending with application Serial No. 458,373, filed on May 24, 1965, as a division of said application Serial No. 458,373, and is copending with each of the following applications:

| Serial No. | Filing Date | Title |
|---|---|---|
| (1) 115,875 | June 9, 1961, now abandoned | Fuel Composition. |
| (2) 505,037 [1] | October 24, 1965 | Do. |
| (3) 115,876 | June 9, 1961, now U.S. Patent 3,251,778. | Process of Preventing Scale. |
| (4) 115,877 | June 9, 1961, now abandoned | Process of Breaking Emulsions. |
| (5) 505,039 [2] | October 24, 1965, now U.S. Patent 3,262,791. | Preventing Corrosion. |
| (6) 115,881 | June 9, 1961, now abandoned | Inhibiting Foam. |
| (7) 115,882 | June 9, 1961, now abandoned | Flotation Process. |
| (8) 115,883 | June 9, 1961, now abandoned | Drilling Fluids. |
| (9) 115,884 | June 9, 1961, now abandoned | Treatment of Oil Wells. |
| (10) 308,063 | September 11, 1963, now U.S. Patent 3,259,513. | Anti-Stripping Agents. |

[1] Continuation of 115,875, filed on June 9, 1961, now abandoned.
[2] Continuation of 115,879, filed on June 9, 1961, now abandoned.

This invention relates to polyalkyleneimines and to derivatives thereof. More particularly, this invention relates to polyethyleneimine and to polyethyleneimine derivatives containing various groups, such as the oxyalkylated, acylated, alkylated, carbonylated, olefiniated, etc., derivatives thereof, prepared by introducing such groups individually, alternatively, in combination, etc., including for example, derivatives prepared by varying the order of adding such groups, by increasing the number and order of adding such groups, and the like.

This invention also relates to methods of using these products, which have an unexpectedly broad spectrum of uses, for example, as demulsifiers for water-in-oil emulsions; as demulsifiers for oil-in-water emulsions; as corrosion inhibitors; as fuel oil additives for gasoline, diesel fuel, jet fuel, and the like; as lubricating oil additives; as scale preventatives; as chelating agents or to form chelates which are themselves useful, for example, as antioxidants, gasoline stabilizers, fungicides, etc.; as flotation agents, for example, as flotation collection agents; as asphalt additives or anti-stripping agents for asphalt-mineral aggregate compositions; as additives for compositions useful in acidizing calcareous stratas of oil wells; as additives for treating water used in the secondary recovery of oil and indisposal wells; as additives used in treating oil-well strata in primary oil recovery to enhance the flow of oil; as emulsifiers for both oil-in-water and water-in-oil emulsions; as additives for slushing oils; as additives for cutting oils; as additives for oil to prevent emulsification during transport; as additives for drilling muds; as agents useful in removing mud sheaths from newly drilled wells; as dehazing or "fog-inhibiting" agents for fuels; as additives for preparing sand or mineral slurries useful in treating oil wells to enhance the recovery of oil; as agents for producing polymeric emulsions useful in preparing water-vapor impermeable paper board; as agents in paraffin solvents; as agents in preparing thickened silica aerogel lubricants; as gasoline additives to remove copper therefrom; as deicing and anti-stalling agents for gasoline; as antiseptic, preservative, bactericidal, bacteriostatic, germicidal, fungicidal agents; as agents for the textile industry, for example, as mercerizing assistants, as wetting agents, as rewetting agents, as dispersing agents, as detergents, as penetrating agents, as softening agents, as dyeing assistants, as anti-static agents, and the like; as additives for rubber latices; as entraining agents for concrete and cements; as anti-static agents for rugs, floors, upholstery, plastic and wax polishes, textiles, etc.; as detergents useful in metal cleaners, in floor oils, in dry cleaning, in general cleaning, and the like; as agents useful in leather processes such as in flat liquoring, pickling, acid degreasing, dye fixing, and the like; as agents in metal pickling; as additives in paints for improved adhesion of primers, in preventing water-spotting in lacquer; as anti-skinners for pigment flushing, grinding and dispersing, as antifeathering agents in ink; as agents in the preparation of wood pulp and pulp slurries, as emulsifiers for insecticidal compositions and agricultural sprays such as DDT, 24–D (Toxaphene), chlordane, nicotine sulfate, hexachloracyclohexane, and the like; as agents useful in building materials, for example, in the water repellent treatment of plaster, concrete, cement, roofing materials, floor sealers; as additives in bonding agents for various insulating building materials; and the like.

Polyalkyleneimine employed in this invention include high molecular weight polyethyleneimine, i.e., polymers of ethyleneimine,

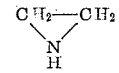

or substituted products thereof:

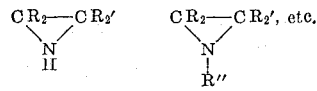

wherein R, R' and R" are hydrogen or a substituted group, for example a hydrocarbon group such as alkyl, cycloalkyl, aryl, aralkyl, alkaryl, etc., but preferably hydrogen or alkyl.

Thus, polyethyleneimine is polymerized, substituted or an unsubstituted, 1,2-alkyleneiminie. Although polyethyleneimine is the preferred embodiment, other illustrative examples include, for example,

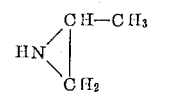

1,2-propyleneimine

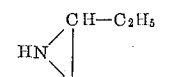

1,2-butyleneimine

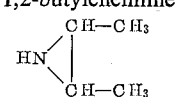

2,3-butyleneimine

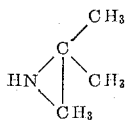

1,1-dimethylethylimine

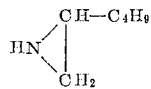

C-butylethyleneimine

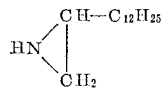

C-dodecylethyleneimine

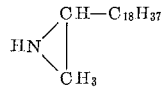

C-octadecylethyleneimine

A preferred class of polymerized 1,2 alkyleneimines include those derived from polymerizing

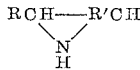

wherein R and R' are hydrogen or an alkyl radical, the latter being the same or different. Of the substituted ethyleneimines, propyleneimines are preferred.

The polyethyleneimines useful herein have molecular weights of, for example, at least 800, for example from 800 to 100,000 or higher, but preferably 20,000 to 75,000 or higher. There is no upper limit to the molecular weight of the polymer employed herein and molecular weights of 200,000, 500,000 or 1,000,000 or more can be employed.

The optimum molecular weight will depend on the particular derivative, the particular use, etc.

Although these products are generally prepared by polymerizing 1,2 alkyleneimines, they may also be prepared by other known methods, for example, by decarboxylating 2-oxazolidine as described in Patent 2,806,839, etc.

Commercial examples of these compounds are available, for example, those sold in a 50% by weight aqueous solution having a molecular weight of 30–40,000. Propyleneimine is also commercially available and suitable polymers can be prepared from this material.

For convenience and simplicity, this invention will be illustrated by employing polyethyleneimine.

Polyethyleneimine is a well known polymer whose preparation from ethyleneimine is described in U.S. Patent 2,182,306 and elsewhere. For convenience in polymerizing and handling, the polymer is generally prepared as an aqueous solution. Water can be removed, if desired, by distilling the water therefrom or by azeotroping the water therefrom in the presence of a hydrocarbon, such as xylene, and using the solution and/or suspension obtained thereby for further reaction or use. The following polyethyleneimines of the molecular weights indicated are employed herein to illustrate this invention.

| Polymer designation: | Approx. mol. wt. range |
|---|---|
| Polyethyleneimine 900 | 800–1000 |
| Polyethyleneimine 5,000 | 4000–6000 |
| Polyethyleneimine 11,500 | 10,500–12,500 |
| Polyethyleneimine 20,000 | 18,000–22,000 |
| Polyethyleneimine 35,000 | 30,000–40,000 |
| Polyethyleneimine 50,000 | 40,000–60,000 |
| Polyethyleneimine 75,000 | 65,000–85,000 |
| Polyethyleneimine 100,000 | 80,000–125,000 |

ACYLATION

A wide variety of acylating agents can be employed. Acylation is carried out under dehydrating conditions, i.e., water is removed. Any of the well-known methods of acylation can be employed. For example, heat alone, heat and reduced pressure, heat in combination with an azeotroping agent, etc., are all satisfactory.

The temperature at which reaction between the acylating agent and polyethyleneimine is effected is not too critical a factor. Since the reactions involved appear to be an amide-formation reaction and a condensation reaction, the general temperature conditions for such reactions, which are well known to those skilled in the art, are applicable.

Acylation is conducted at a temperature sufficiently high to eliminate water and below the pyrolytic point of the reactants and the reaction products. In general, the reaction is carried out at a temperature of from 120° to 280° C., but preferably at 140° to 200° C.

The product formed on acylation will vary with the particular conditions employed. First the salt, then the amide is formed. If, however, after forming the amide at a temperature between 140°–250° C., but usually not above 200° C., one heats such products at a higher range, approximately 250–280° C., or higher, possibly up to 300° C. for a suitable period of time, for example, 1–2 hours or longer, one can in many cases recover a second mole of water for each mole of carboxylic acid group employed, the first mole of water being evolved during amidification. The product formed in such cases contains a cyclic amidine ring, such as an imidazoline or a tetrahydropyrimidine ring. Infrared analysis is a convenient method of determining the presence of these groups.

Water is formed as a by-product of the reaction between the acylating agent and polyethyleneimine. In order to facilitate the removal of this water, to effect a more complete reaction in accordance with the principle of Le Chatelier, a hydrocarbon solvent which forms an azeotropic mixture with water can be added to the reaction mixture. Heating is continued with the liquid reaction mixture at the preferred reaction temperature, until the removal of water by azeotropic distillation has substantially ceased. In general, any hydrocarbon solvent which forms an azeotropic mixture with water can be used. It is preferred, however, to use an aromatic hydrocarbon solvent of the benzene series. Non-limiting examples of the preferred solvent are benzene, toluene, xylene. The amount of solvent used is a variable and non-critical factor. It is dependent on the size of the reaction vessel and the reaction temperature selected. Accordingly, a sufficient amount of solvent must be used to support the azeotropic distillation, but a large excess must be avoided since the reaction temperature will be lowered thereby. Water produced by the reaction can also be removed by operating under reduced pressure. When operating with a reaction vessel equipped with a reflux condenser provided with a water takeoff trap, sufficient reduced pressure can be achieved by applying a slight vacuum to the upper end of the condenser. The pressure inside the system is usually reduced to between about 50 and about 300 millimeters. If desired, the water can be removed also by distillation, while operating under relatively high temperature conditions.

The time of reaction between the acylating agent and polyethyleneimine is dependent on the weight of the charge, the reaction temperature selected, and the means employed for removing the water from the reaction mixture. In practice, the reaction is continued until the formation of water has substantially ceased. In general, the time of reaction will vary between about 4 hours and about ten hours.

Although a wide variety of carboxylic acids produce excellent products, carboxylic acids having more than six carbon atoms and less than 40 carbon atoms but preferably 8–30 carbon atoms give most advantageous products. The most common examples include the detergent forming acids, i.e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids, produced by the oxidation of petroleum. As will be subsequently indicated, there are other acids which have somewhat similar characteristics and are derived from somewhat different sources and are different in structure, but can be included in the broad generic term previously indicated.

Suitable acids include straight chain and branched chain, saturated and unsaturated, aliphatic, alicyclic, fatty, aromatic, hydroaromatic, and aralkyl acids, etc.

Examples of saturated aliphatic monocarboxylic acids are acetic, propionic, butyric, valeric, caproic, heptanoic, caprylic, nonanoic, capric, undecanoic, lauric, tridecanoic, myristic, pentadecanoic, palmitic, heptadecanoic, stearic, nonadecanoic, eicosanoic, heneicosanoic, docosanoic, tricosanoic, tetracosanois, pentacosanoic, cerotic, heptacosanoic, montanic, nonacosanoic, melissic and the like.

Examples of ethylenic unsaturated aliphatic acids are acrylic, methacrylic, crotonic, anglic, teglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodencenoic acids, for example, laurolenic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetradosenic acids, and the like.

Examples of dienoic acids are the pentadienoic acids, the hexadienoic acids, for example, sorbic acids, the octadienoic acids, for example, linoleic, and the like.

Examples of the trienoic acids are the octadecatrienoic acids, for example, linolenic acid, eleostearic acid, pseudo-eleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxy-myristic acids, the hydroxypentadecanoic acids, the hydroxy-palmitic acids, the hydroxyhexadecanoic acids, the hydroxyheptadecanoic acids, the hydroxy stearic acids, the hydroxyoctadecenoic acids, for example, ricinoleic acid, ricinelardic acid, hydroxyoctadecynoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxy acids are ricinoleyl lactic acid, acetyl ricinoleic acid, chloroacetyl ricinoleic acid, and the like.

Examples of the cyclic aliphatic carboxylic acids are those found in petroleum called naphthenic acids, hydrocarbic and chaumoogric acids, cyclopentane carboxylic acids, cyclohexanecarboxylic acid, campholic acid, fenchlolic acids, and the like.

Examples of aromatic monocarboxylic acids are benzoic acid, substituted benzoic acids, for example, the toluic acids, the xyleneic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soybean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyridine carboxylic acid, blown oils, blown oil fatty acids, and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, onnanedicarboxylic acid, decanedicarboxylic acids, undecanedicarboxylic acids, and the like.

Examples of unsaturated aliphatic polycarboxylic acids are fumaric, maleic, mesocenic, citraconic, glutonic, itaconic, muconic, aconitic acids, and the like.

Examples of aromatic polycarboxylic acids are phthalic, isophthalic acids, terephthalic acids, substituted derivatives thereof, (e.g., alkyl, chloro, alkoxy, etc., derivatives), biphenyldicarboxylic acid, diphenylether dicarboxylic acids, diphenylsulfone dicarboxylic acids, and the like.

Higher aromatic polycarboxylic acids containing more than two carboxylic groups are himimellitic, trimellitic, trimesic, mellophanic, prehnitic, pyromellitic acids, mellitic acid, and the like.

Other polycarboxylic acids are the dimeric, trimeric, and polymeric acids, for example, dilinoleic, trilinoleic, and other polyacids sold by Emery Industries, and the like. Other polycarboxylic acids include those containing ether groups, for example, diglycolic acid. Mixtures of the above acids can be advantageously employed.

In addition, acid precursors such as acid anhydrides, esters, acid halides, glycerides, etc., can be employed in place of the free acid.

Examples of acid anhydrides are the alkenyl succinic acid anhydrides.

Any alkenyl succinic acid anhydride or the corresponding acid is utilizable for the production of the reaction products of the present invention. The general structural formulae of these compounds are:

Anhydride

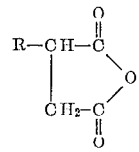

Acid

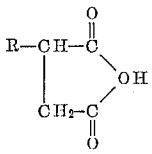

wherein R is an alkenyl radical. The alkenyl radical can be straight-chain or branched-chain; and it can be saturated at the point of unsaturation by the addition of a substance which adds to olefinic double bonds, such as hydrogen, sulfur, bromine, chlorine, or iodine. It is obvious, of course, that there must be at least two carbon atoms in the alkenyl radical, but there is no real upper limit to the number of carbon atoms therein. However, it is preferred to use an alkenyl succinic acid anhydride reactant having between about 8 and about 18 carbon atoms per alkenyl radical. Although their use is less desirable, the alkenyl succinic acids also react, in accordance with this invention, to produce satisfactory reaction products. It has been found, however, that their use necessitates the removal of water formed during the reaction and also often causes undesirable side reactions to occur to some extent. Nevertheless, the alkenyl succinic acid anhydrides and the alkenyl succinic acids are interchangeable for the purposes of the present invention. Accordingly, when the term "alkenyl succinic acid anhydride," is used herein, it must be clearly understood that it embraces the alkenyl succinic acids as well as their anhydrides, and the derivatives thereof in which the olefinic double bond has been saturated as set forth hereinbefore. Non-limiting examples of the alkenyl succinic acid anhydride reactant are ethenyl succinic acid anhydrides; ethenyl succinic acid; ethyl succinic acid anhydride; propenyl succinic acid anhydride; sulfurized propenyl succinic acid anhydride; butenyl succinic acid; 2-methylbutenyl succinic acid anhydride; 1,2-dichloropentyl succinic acid anhydride; hexenyl succinic acid anhydride; hexyl succinic acid; sulfurized 3-methylpentenyl succinic acid anhydride; 2,3-dimethylbutenyl succinic acid anhydride; 3,3-dimethylbutenyl succinic acid; 1,2-dibromo-2-ethylbutyl succinic acid; heptenyl succinic acid anhydride; 1,2-diiodooctyl succinic acid; octenyl succinic acid anhydride; 2-methyl-heptenyl succinic acid anhydride; 4-ethylhexenyl succinic acid; 2-isopropylpentenyl succinic acid anhydride; noneyl succinic acid anhydride; 2-propylhexenyl succinic acid anhydride; decenyl succinic acid; decenyl succinic acid anhydride; 5-methyl - 2 - isopropylhexenyl succinic acid anhydride; 1,2 - dibromo - 2 - ethylocetenyl succinic acid anhydride; decyl succinic acid anhydride; undecenyl succinic acid anhydride; 1,2-dichloro-undecyl succinic acid anhydride; 1,2-dichloro-undecyl succinic acid; 3-ethyl-2-t-butylpentenyl succinic acid anhydride; dodecenyl succinic acid anhydride; dodecenyl succinic acid; 2-propylnoneyl succinic acid anhydride; 3-butyloctenyl succinic acide anhydride; tridecenyl succinic acid anhydride; tetradecenyl succinic acid anhydride; hexadecenyl succinic acid anhydride; sulfurized octadecenyl succinic acid; octadecyl succinic acid anhydride; 1,2-dibrom-2-methylpentadecenyl succinic acid anhydride; 8-propylpentadecyl succinic acid anhydride; eicosenyl succinic acid anhydride; 1,2-dichloro-2-methylnonadecenylsuccinic acid anhydride; 2-octyldodecenyl succinic acid anhydride; 1,2-diiodotetracosenyl succinic acid anhydride; hexacosenyl succinic acid; hexacosenyl succinic acid anhydride; and hentriocontenyl succinic acid anhydride.

The methods of preparing the alkenyl succinic acid anhydrides are well known to those familiar with the art. The most feasible method is by the reaction of an olefin with maleic acid anhydride. Since relatively pure olefins are difficult to obtain, and when thus obtainable, are often too expensive for commercial use, alkenyl succinic acid anhydrides are usually prepared as mixtures by reacting mixtures of olefins with maleic acid anhydride. Such mixtures, as well as relatively pure anhydrides, are utilizable herein.

In summary, without any intent of limiting the scope of the invention, acylation includes amidification, the formation of the cylic amidine ring, the formation of acid imides such as might occur when anhydrides such as the alkenyl succinic acids are reacted, i.e.

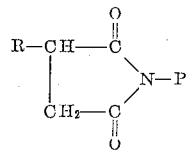

wherein P=the polyethyleneimine residue, polymers as might occur when a dicarboxylic acid is reacted intermolecularly with polyethyleneimine, cyclization as might occur when a dicarboxylic acid reacts intramolecularly with polyethyleneimine as contrasted to intermolecular reactions, etc. The reaction products may contain other substances. Accordingly, these reaction products are most accurately defined by a definition comprising a recitation of the process by which they are produced, i.e., by acylation.

The moles of acylating agent reacted with polyethyleneimine will depend on the number of acylation reactive positions contained therein as well as the number of moles of acylating agent one wishes to incorporate into the polymer. Theoretically one mole of acylating agent can be reacted per amino group on the polyethyleneimine molecule. We have advantageously reacted 1–20 moles of acylating agent per mole of polyethyleneimine 900, but preferably 1–12 moles. Proportionately greater amounts of acylating agent can be employed with polyethyleneimine of higher molecular weight. Thus, with polyethyleneimine 20,000, 1–50 moles of acylating agent can be employed, and with polyethyleneimine 35,000, 1–100 moles can be employed etc. Optimum acylation will depend on the particular use.

The following examples are illustrative of the preparation of the acylated polyethyleneimine.

The following general procedure is employed in acylating. A xylene suspension of polyethyleneimine, after the removal of water, is mixed with the desired ratio of acid. Heat is then applied. After the removal of the calculated amount of water (1 to 2 equivalents per carboxylic acid group of the acid employed), heating is stopped and the azeotroping agent is evaporated under vacuum. The temperature during the reaction can vary from 80° to 200° C. Where the formation of the cyclic amidine type structure is desired, the maximum temperature is generally 180–250° C. and more than one mole of water per carboxylic group is removed. The reaction times range from 4 to 24 hours. Here again, the true test of the degree of reaction is the amount of water removed.

*Example 1–A$_7$*

The reaction is carried out in a 5 liter, 3 necked flask furnished with a stirring device, thermometer, phase separating trap, condenser and heating mantle to 1 mole (900 grams) of polyethyleneimine 900 in an equal weight of xylene, (i.e., 900 grams), 200 grams of lauric acid (1 mole) is added with stirring in about ten minutes. The reaction mixture is then heated gradually to about 145° C. in half and hour and then held at about 160° C. over a period of 3 hours until 19 grams (1.1 mole) of water is collected in the side of the tube. The solvent is then removed with gentle heating under reduced pressure of aproximately 20 mm. The product is a dark, viscous, xylene-soluble liquid.

*Example 1–A$_6$*

The prior example is repeated except that the final reaction temperature is maintained at 240° C. and 36 grams (2 moles) of water are removed instead of 19 grams (1.1 mole). Infrared analysis of the product indicates the presence of a cyclic amidine ring.

The following examples of acylated polyethyleneimines are prepared in the manner of the above examples from the polyethyleneimine noted in the following table. The products obtained are dark, viscous materials.

In the examples the symbol "A" identifies the acylated polyethyleneimine. Thus, specifically "1–A," represents acylated polyethyleneimine.

TABLE I.—ACYLATED PRODUCTS OF POLYETHYLENEIMINE

| Ex. | Acid | Molecular weight of polyethyleneimine (PE) | Ratio mols of acid per mol of PE | Ratio mols of water removed per mol of acid |
|---|---|---|---|---|
| 1-A₁ | Lauric (200) | 900 | 10:1 | 1.12 |
| 1-A₂ | ----do---- | 900 | 8:1 | 1.3 |
| 1-A₃ | ----do---- | 900 | 6:1 | 1.5 |
| 1-A₄ | ----do---- | 900 | 5:1 | 1.1 |
| 1-A₅ | ----do---- | 900 | 4:1 | 1.85 |
| 1-A₆ | ----do---- | 900 | 1:1 | 2.0 |
| 1-A₇ | ----do---- | 900 | 1:1 | 1.1 |
| 2-A₁ | Oleic (282) | 5,000 | 6:1 | 1.3 |
| 2-A₂ | ----do---- | 5,000 | 5:1 | 1.02 |
| 2-A₃ | ----do---- | 5,000 | 4:1 | 1.6 |
| 2-A₄ | ----do---- | 5,000 | 1:1 | 2.0 |
| 3-A₁ | Acetic (60) | 11,500 | 10:1 | 1.3 |
| 3-A₂ | ----do---- | 11,500 | 5:1 | 1.8 |
| 3-A₃ | ----do---- | 11,500 | 2:1 | 1.1 |
| 3-A₄ | ----do---- | 11,500 | 1:1 | 1.2 |
| 4-A₁ | Palmitic (256.4) | 11,500 | 3:1 | 1.6 |
| 4-A₂ | ----do---- | 11,500 | 2:1 | 1.3 |
| 4-A₃ | ----do---- | 11,500 | 1:1 | 2.0 |
| 5-A₁ | Stearic (284) | 20,000 | 3:1 | 1.4 |
| 5-A₂ | ----do---- | 20,000 | 2:1 | 1.1 |
| 6-A₁ | Dimeric (600) | 20,000 | 3:1 | 1.5 |
| 6-A₂ | ----do---- | 20,000 | 2:1 | 2.0 |
| 6-A₃ | ----do---- | 20,000 | 1:1 | 1.1 |
| 6-A₄ | ----do---- | 20,000 | 1:2 | 2.0 |
| 7-A₁ | Nonanoic (158) | 50,000 | 3:1 | 1.7 |
| 7-A₂ | ----do---- | 50,000 | 2:1 | 1.6 |
| 7-A₃ | ----do---- | 50,000 | 1:1 | 1.5 |
| 8-A₁ | Myristic (228.4) | 50,000 | 3:1 | 1.1 |
| 8-A₂ | ----do---- | 50,000 | 2:1 | 1.9 |
| 8-A₃ | ----do---- | 50,000 | 1:1 | 1.3 |
| 9-A₁ | Alkenyl (C₁₂) succinic anhy. (266). | 50,000 | 6:1 | 1.5 |
| 9-A₂ | ----do---- | 50,000 | 4:1 | 1.6 |
| 9-A₃ | ----do---- | 50,000 | 2:1 | 1.4 |
| 10-A₁ | Naphthenic (330) (Sunaptic acid B). | 50,000 | 2:1 | 1.8 |
| 10-A₂ | ----do---- | 50,000 | 1:1 | 1.2 |
| 11-A₁ | Maleic anhydride (98) | 50,000 | 1:1 | |
| 11-A₂ | ----do---- | 50,000 | 0.8:1 | |
| 11-A₃ | ----do---- | 50,000 | 1:2 | |
| 12-A₁ | Oleic (282) | 100,000 | 2:1 | 1.6 |
| 12-A₂ | ----do---- | 100,000 | 1:1 | 1.4 |
| 13-A₁ | Diglycolic (134) | 100,000 | 1:1 | 1.0 |
| 13-A₂ | ----do---- | 100,000 | 1:2 | 2.0 |
| 14-A₁ | Diphenolic (286) | 100,000 | 2:1 | 1.1 |
| 14-A₂ | ----do---- | 100,000 | 1:1 | 1.1 |

The following table presents specific illustration of compounds other than polyethyleneimine and its derivatives.

TABLE I-A.—ACYLATED PRODUCTS OF POLYPROPYLENEIMINE

| Ex. | Molecular weight of polypropyleneimine | Acid | Mols of acid per mol of polypropyleneimine | Mols of water removed per mol of acid |
|---|---|---|---|---|
| 15-A₁ | 500 | Stearic (284) | 2:1 | 1.9 |
| 15-A₂ | 500 | ----do---- | 1:1 | 1.1 |
| 15-A₃ | 500 | Lauric (200) | 1:1 | 0.9 |
| 16-A₁ | 1,000 | Oleic (282) | 3:1 | 1.0 |
| 16-A₂ | 1,000 | Palmitic (256.4) | 1:1 | 1.2 |
| 16-A₃ | 1,000 | Acetic (60) | 2:1 | 1.0 |
| 17-A₁ | 5,000 | Stearic (284) | 1:1 | 2.0 |
| 17-A₂ | 5,000 | ----do---- | 3:1 | 1.3 |
| 17-A₃ | 5,000 | Dimeric (600) | 1:1 | 1.5 |
| 18-A₁ | 10,000 | Diglycolic (134) | 4:1 | 0.9 |
| 18-A₂ | 10,000 | Diphenolic (286) | 2:1 | 1.0 |
| 18-A₃ | 10,000 | Naphthenic (330) | 1:1 | 1.0 |
| 19-A₁ | 20,000 | Maleic anhydride (98) | 1:1 | |
| 19-A₂ | 20,000 | Nonanoic (158) | 4:1 | 3.2 |
| 19-A₃ | 20,000 | Oleic (282) | 2:1 | 2.1 |
| 20-A₁ | 40,000 | Myristic (228.4) | 2:1 | 1.7 |
| 20-A₂ | 40,000 | Oleic (282) | 3:1 | 2.8 |
| 20-A₃ | 40,000 | Alkenyl (C₁₂) succinic anhydride (266). | 1:1 | |

OXYALKYLATION

Polyethyleneimine can be oxyalkylated in the conventional manner, for example, by means of an alpha-beta alkylene oxide such as ethylene oxide, propylene oxide, butylene oxide, octylene oxide, a higher alkylene oxide, styrene oxide, glycide, methylglycide, etc., or combinations thereof. Depending on the particular application desired, one may combine a large proportion of alkylene oxide, particularly ethylene oxide, propylene oxide, a combination or alternate additions of propylene oxide and ethylene oxide, or smaller proportions thereof in relation to polyethyleneimine. Thus, the molar ratio of alkylene oxide to polyethyleneimine can range within wide limits, for example, from a 1:1 mole ratio to a ratio of 1000:1, or higher, but preferably 1 to 200. For example, in demulsification extremely high alkylene oxide ratios are often advantageously employed such as 200-300 or more moles of alkylene oxide per mole of polyethyleneimine. On the other hand, for certain applications such as corrosion prevention and use as fuel oil additives, lower ratios of alkylene oxides are advantageously employed, i.e., 1—10–25 moles of alkylene oxides per mole of polyethyleneimine. With higher molecular weight polyethyleneimine, more oxyalkylatable reaction centers are present for alkylene oxide addition and very high ratios of alkylene oxide can be added. By proper control, desired hydrophilic or hydrophobic properties are imparted to the composition. As is well known, oxyalkylation reactions are conducted under a wide variety of conditions, at low or high pressures, at low or high temperatures, in the presence or absence of catalyst, solvent, etc. For instance oxyalkylation reactions can be carried out at temperatures of from 80–200° C., and pressures of from 10 to 200 p.s.i., and times of from 15 min. to several days. Preferably oxyalkylation reactions are carried out at 80 to 120° C. and 10 to 30 p.s.i. For conditions of oxyalkylation reactions see U.S. Patent 2,792,369 and other patents mentioned therein.

Oxyalkylation is too well known to require a full discussion. For purpose of brevity reference is made to Parts One and Two of U.S. Patent No. 2,792,371, dated May 14, 1957, to Dickson in which particular attention is directed to the various patents which describe typical oxyalkylation procedure. Furthermore, manufacturers of alkylene oxides furnish extensive information as to the use of oxides. For example, see the technical bulletin entitled, "Ethylene Oxide," which has been distributed by the Jefferson Chemical Company, Houston, Texas. Note also the extensive bibliography in this bulletin and the large number of patents which deal with oxyalkylation processes.

The symbol employed to designate oxyalkylation is "O." Specifically, "1–O" represents oxyalkylated polyethyleneimine.

In the following oxyalkylations the reaction vessel employed is a stainless steel autoclave equipped with the usual devices for heating and heat control, a stirrer, inlet and outlet means and the like which are conventional in this type of apparatus. The stirrer is operated at a speed of 250 r.p.m. Polyethyleneimine dissolved and/or suspended in an equal weight of xylene is charged into the reactor. The autoclave is sealed, swept with nitrogen, stirring started immediately and heat applied. The temperature is allowed to rise to approximately 100° C. at which time the addition of the alkylene oxide is started and added continuously at such speed as it is absorbed by the reaction mixture. When the rate of oxyalkylation slows down appreciably, which generally occurs after about 15 moles of ethylene oxide are added or after about 10 moles of propylene oxide are added, the reaction vessel is opened and an oxyalkylation catalyst is added (in 2 weight percent of the total reactants present). The catalyst employed in the examples is sodium methylate. Thereupon the autoclave is flushed out as before and oxyalkylation completed. In the case of oxybutylation, oxyoctylation, oxystyrenation, and other oxyalkylations, etc., the catalyst is added at the beginning of the operation.

*Example 1–O₁*

Using the oxyalkylation apparatus and procedure stated above, the following compounds are prepared: 900 grams (1 mol) of polyethyleneimine 900 in xylene are charged into a stainless steel autoclave, swept with nitrogen, stirring started, and autoclave sealed. The temperature is allowed to rise approximately 100° C. and ethylene oxide is injected continuously until 220 grams (5 mols) total had been added over a one-half hour period. This reaction is exothermic and requires cooling to avoid a rise in temperature after removal of xylene. The reaction mass is transferred to a suitable container. Upon cooling to room temperature, the reaction mass is a dark extremely viscous liquid.

*Example 1–$O_2$*

The same procedure as Example 1–$O_1$ is used except that 396 grams of ethylene oxide (9 mols) is added to 900 grams (1 mol) of polyethyleneimine 900. This reaction material is a dark viscous liquid at room temperature.

*Example 1–$O_3$*

The same procedure as Example 1–$O_1$ is used and 396 grams of ethylene oxide (9 mols) are added to 900 grams (1 mol) of polyethyleneimine 900. After this reaction is completed, the autoclave is opened and 20 grams of sodium methylate are added. The autoclave is then flushed again with nitrogen and an additional 572 grams (13 mols) of ethylene oxide is added at 100° C. This reaction is highly exothermic. The reaction mass now contains 1 mol of polyethyleneimine 900 and a total of 22 mols of reacted ethylene oxide.

*Example 1–$O_4$*

A portion of the reaction mass of Example 1–$O_3$ is transferred to another autoclave and an additional amount of EtO was added. The reaction mass now contains the ratio of 1 mol of polyethyleneimine 900 to 40 mols of EtO.

*Example 1–$O_5$*

The addition of ethylene oxide to Example 1–$O_4$ is continued until a molar ratio of 1 mol of polyethyleneimine 900 to 75 mols of EtO is reached.

*Example 1–$O_6$*

The addition of ethylene oxide to Example 1–$O_5$ is continued until a molar ratio of 1 mol of polyethyleneimine 900 to 83 mols of EtO is reached.

*Example 1–$O_7$*

The addition of ethylene oxide to the Example 1–$O_6$ is continued until a molar ratio of 1 mol of polyethyleneimine 900 to 105 mols of EtO is reached.

*Example 16–$O_1$*

2,000 grams (0.1 mol) of polyethyleneimine of molecular weight of 20,000 in xylene are charged into a conventional stainless steel autoclave. The temperature is raised to 120° C., the autoclave is flushed with nitrogen and sealed. Then 11.6 grams of propylene oxide (0.2 mol) are added slowly at 120° C. A sample is taken at this point and labeled 16–$O_1$. This sample contains two mols of PrO for each mol of polyethyleneimine. It is a dark, pasty solid at room temperature.

*Example 16–$O_2$*

The addition of propylene oxide to 16–$O_1$ is continued as follows: The autoclave is opened and 5 grams of sodium methylate are added. The autoclave is again purged with nitrogen and sealed. Propylene oxide is added carefully until an additional 23.2 grams have been reacted. A sample is taken at this point and labeled 16–$O_2$. This compound now contains 6 mols of propylene oxide for each mol of polyethyleneimine 20,000.

*Example 16–$O_3$*

The oxypropylation of 16–$O_2$ is continued until an additional 52.2 grams of propylene oxide are reacted. A sample is taken at this point and labeled 16–$O_3$. 16–$O_3$ contains 15 mols of propylene oxide for each mol of polyethyleneimine 20,000. At room temperature the product is a dark, pasty solid.

This oxyalkylation is continued to produce Examples 16–$O_4$, 16–$O_5$.

A summary of oxyalkylated products produced from polyethyleneimines is presented in the following Table II.

The Roman numerals, (I), (II), and (III) besides the moles of oxide added indicate the order of oxide addition (I) first, (II) second and (III) third, etc.

The following abbreviations are also used throughout this application: EtO—ethylene oxide; PrO—propylene oxide; BuO—butylene oxide.

TABLE II.—OXYALKYLATED PRODUCTS

| Ex. | Mol. wt. of PE | Mols of alkylene oxide/mol polyethyleneimine | | | Physical properties |
|---|---|---|---|---|---|
| | | EtO | PrO | BuO | |
| 1-$O_1$ | 900 | 5 | | | Viscous liquid. |
| 1-$O_2$ | 900 | 9 | | | Solid. |
| 1-$O_3$ | 900 | 22 | | | Do. |
| 1-$O_4$ | 900 | 40 | | | Do. |
| 1-$O_5$ | 900 | 75 | | | Do. |
| 1-$O_6$ | 900 | 83 | | | Do. |
| 1-$O_7$ | 900 | 105 | | | Do. |
| 1-$O_8$ | 900 | 200 | | | Do. |
| 2-$O_1$ | 900 | | 5 | | Viscous liquid. |
| 2-$O_2$ | 900 | | 11 | | Do. |
| 2-$O_3$ | 900 | | 20 | | Dark, thick liquid. |
| 2-$O_4$ | 900 | | 50 | | Do. |
| 2-$O_5$ | 900 | | 80 | | Do. |
| 2-$O_6$ | 900 | | 115 | | Do. |
| 2-$O_7$ | 900 | | 190 | | Do. |
| 2-$O_8$ | 900 | | 230 | | Do. |
| 3-$O_1$ | 900 | | | 4 | Do. |
| 3-$O_2$ | 900 | | | 15 | Do. |
| 3-$O_3$ | 900 | | | 35 | Do. |
| 3-$O_4$ | 900 | | | 60 | Do. |
| 4-$O_1$ | 900 | 10 (I) | 10 (II) | | Viscous liquid. |
| 4-$O_2$ | 900 | 10 (I) | 10 (II) | | Do. |
| 4-$O_3$ | 900 | 30 (II) | 10 (I) | | Solid. |
| 4-$O_4$ | 900 | 50 (II) | 60 (I) | | Do. |
| 5-$O_1$ | 900 | Glycidol, 4 mols | | | Viscous liquid. |
| 6-$O_1$ | 900 | 10 (II) | 10 (I) | 12 (III) | Dark, thick liquid. |
| 6-$O_2$ | 900 | 5 (III) | 50 (II) | 5 (I) | Do. |
| 6-$O_3$ | 900 | 18 (II) | 12 (III) | 10 (I) | Do. |
| 6-$O_4$ | 900 | 20 (I) | 90 (II) | 5 (III) | Do. |
| 7-$O$ | 900 | Octylene oxide, 8 mols | | | Viscous liquid. |
| 8-$O$ | 900 | Styrene oxide, 5 mols | | | Do. |
| 9-$O$ | 900 | Epoxide 201, 1 mol | | | Solid. |
| 10-$O_1$ | 5,000 | 1 | | | Viscous liquid. |
| 10-$O_2$ | 5,000 | 7 | | | Do. |
| 10-$O_3$ | 5,000 | 15 | | | Solid. |
| 10-$O_4$ | 5,000 | 30 | | | Do. |
| 10-$O_5$ | 5,000 | 60 | | | Do. |
| 10-$O_6$ | 5,000 | 120 | | | Do. |
| 11-$O_1$ | 5,000 | | 3 | | Viscous liquid. |
| 11-$O_2$ | 5,000 | | 20 | | Dark, thick liquid. |
| 11-$O_3$ | 5,000 | | 40 | | Do. |
| 11-$O_4$ | 5,000 | | 80 | | Do. |
| 11-$O_5$ | 5,000 | | 160 | | Do. |
| 12-$O_1$ | 5,000 | | | 5 | Do. |
| 12-$O_2$ | 5,000 | | | 10 | Do. |
| 12-$O_3$ | 5,000 | | | 15 | Do. |
| 12-$O_4$ | 5,000 | | | 20 | Do. |
| 13-$O_1$ | 5,000 | 20 (I) | 20 (II) | | Viscous liquid. |
| 13-$O_2$ | 5,000 | 15 (I) | 80 (II) | | Solid. |
| 13-$O_3$ | 5,000 | 5 (II) | 45 (I) | | Do. |
| 13-$O_4$ | 5,000 | 10 (II) | 10 (I) | | Do. |
| 14-$O_1$ | 5,000 | 5 (III) | 5 (II) | 5 (I) | Viscous liquid. |
| 14-$O_2$ | 5,000 | 15 (II) | 10 (III) | 5 (I) | Do. |
| 14-$O_3$ | 5,000 | 5 (I) | 40 (II) | 15 (III) | Do. |
| 14-$O_4$ | 5,000 | 35 (I) | 10 (III) | 10 (II) | Solid. |
| 14-$O_5$ | 5,000 | 10 (II) | 15 (I) | 20 (III) | Viscous liquid. |
| 14-$O_6$ | 5,000 | 6 (III) | 3 (I) | 2 (II) | Do. |
| 15-$O_1$ | 20,000 | 10 | | | Solid. |
| 15-$O_2$ | 20,000 | 35 | | | Do. |
| 15-$O_3$ | 20,000 | 60 | | | Do. |
| 15-$O_4$ | 20,000 | 85 | | | Do. |
| 15-$O_5$ | 20,000 | 105 | | | Do. |
| 15-$O_6$ | 20,000 | 140 | | | Do. |
| 16-$O_1$ | 20,000 | | 2 | | Dark, pasty solid. |
| 16-$O_2$ | 20,000 | | 6 | | Do. |
| 16-$O_3$ | 20,000 | | 15 | | Do. |
| 16-$O_4$ | 20,000 | | 35 | | Do. |
| 16-$O_5$ | 20,000 | | 60 | | Do. |
| 17-$O_1$ | 20,000 | 4 (I) | 4 (II) | | Pasty solid. |
| 17-$O_2$ | 20,000 | 15 (I) | 30 (II) | | Do. |
| 17-$O_3$ | 20,000 | 30 (II) | 30 (I) | | Do. |
| 17-$O_4$ | 20,000 | 7 (II) | 18 (I) | | Do. |
| 18-$O_1$ | 20,000 | 5 (I) | | 15 (II) | Solid. |
| 18-$O_2$ | 20,000 | 5 (I) | 40 (III) | 6 (II) | Light brown solid. |
| 18-$O_3$ | 20,000 | 15 (I) | 10 (I) | 30 (III) | Do. |
| 18-$O_4$ | 20,000 | 3 (II) | 8 (III) | 16 (I) | Do. |
| 18-$O_5$ | 20,000 | 20 (III) | 80 (I) | 3 (II) | Do. |
| 18-$O_6$ | 20,000 | 6 (III) | 18 (II) | 6 (I) | Do. |

TABLE II.—OXYALKYLATED PRODUCTS—Continued

| Ex. | Mol. wt. of PE | Mols of alkylene oxide/mol polyethyleneimine | | | Physical properties |
|---|---|---|---|---|---|
| | | EtO | PrO | BuO | |
| 19-O₁ | 50,000 | 2 | | | Light brown solid. |
| 19-O₂ | 50,000 | 6 | | | Do. |
| 19-O₃ | 50,000 | 15 | | | Solid. |
| 19-O₄ | 50,000 | 30 | | | Do. |
| 19-O₅ | 50,000 | 50 | | | Do. |
| 19-O₆ | 50,000 | 100 | | | Do. |
| 19-O₇ | 50,000 | 200 | | | Do. |
| 19-O₈ | 50,000 | 400 | | | Hard solid. |
| 20-O₁ | 50,000 | | 5 | | Pasty solid. |
| 20-O₂ | 50,000 | | 20 | | Do. |
| 20-O₃ | 50,000 | | 40 | | Do. |
| 20-O₄ | 50,000 | | 80 | | Do. |
| 20-O₅ | 50,000 | | 160 | | Do. |
| 20-O₆ | 50,000 | | 320 | | Do. |
| 21-O | 50,000 | Epichlorohydrin, 2 mols | | | Waxy solid. |
| 22-O₁ | 50,000 | 18 (I) | 4 (II) | 4 (III) | Do. |
| 22-O₂ | 50,000 | 6 (II) | 12 (I) | 12 (III) | Do. |
| 22-O₃ | 50,000 | 14 (III) | 22 (I) | 10 (I) | Do. |
| 22-O₄ | 50,000 | 5 (I) | 48 (III) | 6 (II) | Do. |
| 22-O₅ | 50,000 | 1 (II) | 10 (I) | 3 (III) | Do. |
| 22-O₆ | 50,000 | 10 (III) | 80 (I) | 10 (II) | Do. |
| 23-O₁ | 100,000 | 1 | | | Do. |
| 23-O₂ | 100,000 | 5 | | | Do. |
| 23-O₃ | 100,000 | 14 | | | Do. |
| 23-O₄ | 100,000 | 24 | | | Do. |
| 23-O₅ | 100,000 | 48 | | | Do. |
| 23-O₆ | 100,000 | 60 | | | Do. |
| 23-O₇ | 100,000 | 75 | | | Do. |
| 23-O₈ | 100,000 | 150 | | | Do. |
| 24-O₁ | 100,000 | | 1 | | Do. |
| 24-O₂ | 100,000 | | 3 | | Do. |
| 24-O₃ | 100,000 | | 5 | | Do. |
| 24-O₄ | 100,000 | | 10 | | Do. |
| 24-O₅ | 100,000 | | 20 | | Do. |
| 24-O₆ | 100,000 | | 40 | | Do. |
| 24-O₇ | 100,000 | | 80 | | Do. |
| 24-O₈ | 100,000 | | 160 | | Do. |
| 24-O₉ | 100,000 | | 320 | | Do. |
| 24-O₁₀ | 100,000 | | 640 | | Do. |
| 25-O₁ | 100,000 | 25 (I) | 10 (II) | | Do. |
| 25-O₂ | 100,000 | 3 (I) | 3 (II) | 4 (III) | Do. |
| 25-O₃ | 100,000 | 5 (II) | 25 (I) | 30 (III) | Do. |
| 25-O₄ | 100,000 | 6 (II) | 16 (I) | 28 (III) | Do. |
| 26-O₁ | 100,000 | 8 (III) | 8 (II) | 8 (I) | Do. |
| 26-O₂ | 100,000 | 6 (III) | 10 (I) | 4 (II) | Do. |
| 26-O₃ | 100,000 | 5 (I) | 15 (III) | 3 (II) | Do. |
| 26-O₄ | 100,000 | 15 (II) | 20 (I) | 6 (III) | Do. |
| 26-O₅ | 100,000 | 2 (I) | 25 (II) | 2 (III) | Do. |
| 26-O₆ | 100,000 | 4 (I) | 14 (III) | 6 (II) | Do. |

The following table presents specific illustration of compounds other than polyethyleneimine and its derivatives.

TABLE II-A.—OXYALKYLATED PRODUCTS OF POLYPROPYLENEIMINE

| Ex. | Mol. weight of polypropyl-eneimine | Mols of alkylene oxide per mol of polypropyleneimine | | | Physical properties |
|---|---|---|---|---|---|
| | | EtO | PrO | BuO | |
| 27-O₁ | 500 | 1 | | | Viscous liquid. |
| 27-O₂ | 500 | 5 | | | Do. |
| 27-O₃ | 500 | 10 | | | Solid. |
| 27-O₄ | 500 | 20 | | | Do. |
| 27-O₅ | 500 | 50 | | | Do. |
| 27-O₆ | 500 | 100 | | | Do. |
| 28-O₁ | 500 | | 1 | | Viscous liquid. |
| 28-O₂ | 500 | | 5 | | Do. |
| 28-O₃ | 500 | | 10 | | Do. |
| 28-O₄ | 500 | | 20 | | Do. |
| 28-O₅ | 500 | | 50 | | Do. |
| 28-O₆ | 500 | | 100 | | Do. |
| 28-O₇ | 500 | | 200 | | Do. |
| 29-O₁ | 500 | | | 1 | Do. |
| 29-O₂ | 500 | | | 5 | Do. |
| 29-O₃ | 500 | | | 10 | Do. |
| 29-O₄ | 500 | | | 20 | Do. |
| 29-O₅ | 500 | | | 40 | Do. |
| 30-O₁ | 500 | 5 (I) | 10 (II) | | Do. |
| 30-O₂ | 500 | 10 (I) | 5 (II) | | Paste. |
| 31-O₁ | 500 | 20 (II) | 3 (I) | | Solid. |
| 31-O₂ | 500 | 12 (II) | 44 (I) | | Thick dark liquid. |
| 32-O₁ | 500 | 5 (III) | 10 (II) | 10 (I) | Do. |
| 32-O₂ | 500 | 10 (II) | 40 (I) | 3 (III) | Do. |
| 32-O₃ | 500 | 15 (I) | 80 (II) | 1 (III) | Do. |
| 32-O₄ | 500 | 5 (I) | 20 (III) | 2 (II) | Do. |
| 33-O | 500 | Octylene oxide, 5 mols | | | Do. |
| 34-O | 500 | Styrene oxide, 3 mols | | | Do. |
| 35-O | 500 | Epoxide 201, 1 mol | | | Solid. |
| 36-O₁ | 1,000 | 1 | | | Viscous liquid. |
| 36-O₂ | 1,000 | 3 | | | Do. |
| 36-O₃ | 1,000 | 12 | | | Solid. |
| 36-O₄ | 1,000 | 18 | | | Do. |
| 36-O₅ | 1,000 | 50 | | | Do. |
| 36-O₆ | 1,000 | 100 | | | Do. |

TABLE II-A.—OXYALKYLD PRODUCTS OF POLYPROPYLENEIMINE—Continued

| Ex. | Mol. weight of polypropyl-eneimine | Mols of alkylene oxide per mol of polypropyleneimine | | | Physical properties |
|---|---|---|---|---|---|
| | | EtO | PrO | BuO | |
| 36-O₇ | 1,000 | 300 | | | Waxy solid. |
| 37-O₁ | 1,000 | | 5 | | Viscous liquid. |
| 37-O₂ | 1,000 | | 10 | | Do. |
| 37-O₃ | 1,000 | | 20 | | Do. |
| 37-O₄ | 1,000 | | 40 | | Do. |
| 37-O₅ | 1,000 | | 80 | | Do. |
| 38-O₁ | 1,000 | 10 (I) | 20 (II) | | Do. |
| 38-O₂ | 1,000 | 15 (II) | 5 (I) | | Solid. |
| 39-O₁ | 1,000 | 4 (I) | 3 (II) | 2 (III) | Viscous liquid. |
| 39-O₂ | 1,000 | 6 (I) | 10 (III) | 3 (II) | Do. |
| 39-O₃ | 1,000 | 14 (III) | 2 (II) | 8 (I) | Solid. |
| 39-O₄ | 1,000 | 10 (II) | 10 (III) | 10 (I) | Thick liquid. |
| 40-O | 1,000 | Epoxide 201, 2 mols | | | Solid. |
| 41-O | 1,000 | Styrene oxide, 6 mols | | | Viscous liquid. |
| 42-O | 1,000 | Octylene oxide, 2 mols | | | Do. |
| 43-O₁ | 5,000 | 1 | | | Do. |
| 43-O₂ | 5,000 | 5 | | | Do. |
| 43-O₃ | 5,000 | 20 | | | Solid. |
| 43-O₄ | 5,000 | 45 | | | Do. |
| 43-O₅ | 5,000 | 75 | | | Do. |
| 43-O₆ | 5,000 | 125 | | | Do. |
| 44-O₁ | 5,000 | | 3 | | Viscous liquid. |
| 44-O₂ | 5,000 | | 12 | | Thick liquid. |
| 44-O₃ | 5,000 | | 35 | | Do. |
| 44-O₄ | 5,000 | | 60 | | Do. |
| 44-O₅ | 5,000 | | 100 | | Do. |
| 44-O₆ | 5,000 | | 140 | | Do. |
| 44-O₇ | 5,000 | | 200 | | Do. |
| 45-O₁ | 5,000 | 5 (III) | 40 (II) | 3 (I) | Viscous liquid. |
| 45-O₂ | 5,000 | 10 (II) | 80 (III) | 10 (I) | Do. |
| 45-O₃ | 5,000 | 20 (I) | 40 (II) | 4 (III) | Do. |
| 45-O₄ | 5,000 | 2 (I) | 4 (III) | 2 (II) | Do. |
| 46-O₁ | 5,000 | | | 1 | Do. |
| 46-O₂ | 5,000 | | | 3 | Do. |
| 46-O₃ | 5,000 | | | 10 | Do. |
| 46-O₄ | 5,000 | | | 20 | Do. |
| 46-O₅ | 5,000 | | | 40 | Do. |
| 46-O₆ | 5,000 | | | 80 | Do. |
| 47-O | 5,000 | Epichlorohydrin, 2 mols | | | Do. |
| 48-O₁ | 10,000 | 3 | | | Pasty solid. |
| 48-O₂ | 10,000 | 6 | | | Do. |
| 48-O₃ | 10,000 | 15 | | | Do. |
| 48-O₄ | 10,000 | 30 | | | Do. |
| 48-O₅ | 10,000 | 90 | | | Do. |
| 49-O₁ | 10,000 | | 2 | | Do. |
| 49-O₂ | 10,000 | | 5 | | Do. |
| 49-O₃ | 10,000 | | 20 | | Do. |
| 49-O₄ | 10,000 | | 50 | | Do. |
| 50-O₁ | 10,000 | | | 1 | Do. |
| 50-O₂ | 10,000 | | | 3 | Do. |
| 50-O₃ | 10,000 | | | 10 | Do. |
| 51-O₁ | 10,000 | 6 (II) | 10 (III) | 14 (I) | Do. |
| 51-O₂ | 10,000 | 22 (III) | 1 (II) | 4 (I) | Do. |
| 51-O₃ | 10,000 | 6 (I) | 2 (II) | 3 (III) | Do. |
| 51-O₄ | 10,000 | 5 (I) | 18 (III) | 2 (II) | Do. |
| 52-O | 10,000 | Octylene oxide, 4 mols | | | Do. |
| 53-O | 10,000 | Epoxide 201, 1 mol | | | Do. |
| 54-O₁ | 20,000 | 1 | | | Waxy solid. |
| 54-O₂ | 20,000 | 5 | | | Do. |
| 54-O₃ | 20,000 | 25 | | | Do. |
| 54-O₄ | 20,000 | 75 | | | Do. |
| 54-O₅ | 20,000 | 150 | | | Do. |
| 55-O₁ | 20,000 | | 1 | | Do. |
| 55-O₂ | 20,000 | | 3 | | Do. |
| 55-O₃ | 20,000 | | 8 | | Do. |
| 55-O₄ | 20,000 | | 20 | | Do. |
| 55-O₅ | 20,000 | | 40 | | Do. |
| 55-O₆ | 20,000 | | 80 | | Do. |
| 56-O₁ | 20,000 | | | 1 | Do. |
| 56-O₂ | 20,000 | | | 2 | Do. |
| 56-O₃ | 20,000 | | | 3 | Do. |
| 56-O₄ | 20,000 | | | 5 | Do. |
| 56-O₅ | 20,000 | | | 10 | Do. |
| 56-O₆ | 20,000 | | | 20 | Do. |
| 57-O₁ | 20,000 | 6 (I) | 16 (II) | 4 (III) | Do. |
| 57-O₂ | 20,000 | 5 (III) | 40 (II) | 2 (I) | Do. |
| 57-O₃ | 20,000 | 20 (II) | 60 (I) | 5 (III) | Do. |
| 57-O₄ | 20,000 | 5 (I) | 15 (III) | 8 (II) | Do. |
| 58-O₁ | 40,000 | 2 | | | Do. |
| 58-O₂ | 40,000 | 10 | | | Do. |
| 58-O₃ | 40,000 | 15 | | | Do. |
| 58-O₄ | 40,000 | 20 | | | Do. |
| 59-O₁ | 40,000 | | 5 | | Do. |
| 59-O₂ | 40,000 | | 10 | | Do. |
| 59-O₃ | 40,000 | | 20 | | Do. |
| 59-O₄ | 40,000 | | 40 | | Do. |
| 59-O₅ | 40,000 | | 80 | | Do. |
| 60-O₁ | 40,000 | | | 1 | Do. |
| 60-O₂ | 40,000 | | | 3 | Do. |
| 60-O₃ | 40,000 | | | 10 | Do. |
| 60-O₄ | 40,000 | | | 20 | Do. |
| 61-O₁ | 40,000 | 3 (I) | 2 (III) | 6 (II) | Do. |
| 61-O₂ | 40,000 | 40 (I) | 5 (II) | 3 (III) | Do. |
| 61-O₃ | 40,000 | 3 (II) | 18 (III) | 6 (I) | Do. |
| 61-O₄ | 40,000 | 2 (II) | 2 (I) | 2 (III) | Do. |
| 62-O₁ | 40,000 | 20 (I) | 20 (II) | | Do. |
| 62-O₂ | 40,000 | 5 (II) | 40 (I) | | Do. |

ACYLATION THEN OXYALKYLATION

Prior acylated polyethyleneimine can be oxyalkylated in the above manner by starting with acylated polyethyleneimine instead of the unreacted polymer. Non-limiting examples are presented in the following tables. The symbol employed to designate an acylated, oxyalkylated polyethyleneimine is "AO." Specifically,

"$1-A_4O_1$"

represents acylated, then oxyalkylated polyethyleneimine.

Example $1-A_5O_3$

For this example an autoclave equipped to handle alkylene oxides is necessary. 1671 grams (1 mole) of $1-A_5$ are charged into the autoclave. Following a nitrogen purge and the addition of 75 grams of sodium methylate, the temperature is raised to 135° C. and 2436 grams of PrO (42 mols) are added. At the completion of this reaction, 440 grams of EtO (10 mols) are added and the reaction allowed to go to completion. The resulting polymer is a dark viscous fluid soluble in an aromatic solvent. Ratio of reactants 1 mole starting material/PrO 42 mols/EtO 10 mols.

Example $2-A_4O$

For this example a conventional autoclave equipped to handle alkylene oxides is necessary. 525 grams of $2-A_4$ (0.1 mol) are charged into the autoclave. The charge is catalyzed with 20 grams of sodium methylate, purged with nitrogen and heated to 150° C. 24.6 grams (0.2 moles) of styrene oxide are added and reacted for four hours with agitation. The resulting product is a dark extremely viscous fluid. Ratio of reactants 1 mole starting material/2 moles EtO.

These reactions and other reactions are summarized in the following table.

TABLE III.—OXYALKYLATED, PRIOR ACYLATED POLYETHYLENEIMINE
[Mols of oxide per mol of reactant]

| Ex. | EtO | PrO | BuO | Physical properties |
|---|---|---|---|---|
| $1-A_5O_1$ | 5 | | | Viscous liquid. |
| $1-A_5O_2$ | | 22 | | Do. |
| $1-A_5O_3$ | 10 (II) | 42 (I) | | Do. |
| $1-A_5O_4$ | 14 (III) | 26 (II) | 10 (I) | Do. |
| $1-A_5O_5$ | 4 (I) | 12 (II) | | Do. |
| $1-A_5O_6$ | | | 8 | Do. |
| $2-A_4O$ | Styrene oxide, 2 mols | | | Dark, viscous liquid. |
| $4-A_2O$ | 24 | | | Solid. |
| $5-A_2O$ | 2 (I) | 4 (III) | 6 (III) | Thick liquid. |
| $6-A_4O$ | | 6 | | Do. |
| $9-A_2O$ | Octylene oxide, 5 mols | | | Do. |
| $10-A_1O_1$ | 4 (II) | 28 (I) | | Do. |
| $10-A_1O_2$ | 35 | | | Solid. |
| $10-A_1O_3$ | | | 10 | Viscous liquid. |
| $11-A_3O_1$ | | 5 | | Do. |
| $11-A_3O_2$ | 8 (III) | 60 (II) | 2 (I) | Do. |
| $12-A_2O_1$ | 12 | | | Solid. |
| $12-A_2O_2$ | 4 (II) | 5 (I) | | Do. |

The following table presents specific illustration of compounds other than polyethyleneimine and its derivatives.

TABLE III-A.—OXYALKYLATED, PRIOR ACYLATED POLYPROPYLENEIMINE

| Ex. | EtO | PrO | BuO | Physical properties |
|---|---|---|---|---|
| $15-A_2O_1$ | | 10 | | Viscous liquid. |
| $15-A_2O_2$ | 3 | | | Do. |
| $15-A_2O_3$ | 2 (I) | 2 (II) | | Do. |
| $15-A_2O_4$ | 6 (II) | 10 (III) | 2 (I) | Dol |
| $15-A_2O_5$ | | | 4 | Do. |
| $16-A_1O$ | Epoxide 201, 1 mol | | | Do. |
| $17-A_3O_1$ | 10 (II) | 80 (I) | | Do. |
| $17-A_3O_2$ | | | 20 | Do. |
| $18-A_3O_1$ | 3 | | | Pasty solid. |
| $18-A_3O_2$ | Octylene oxide, 5 mols | | | |
| $18-A_3O_3$ | 20 (II) | | 5 (I) | Do. |
| $18-A_3O_4$ | | 8 | | Do. |
| $19-A_3O_1$ | Styrene oxide, 3 mols | | | Do. |
| $19-A_3O_2$ | 5 (III) | 40 (II) | 2 (I) | Do. |
| $19-A_3O_3$ | 12 (II) | 65 (I) | | Do. |
| $20-A_1O_1$ | Epichlorohydrin, 2 mols | | | Do. |
| $20-A_1O_2$ | 1 | | | Do. |
| $20-A_1O_3$ | | 3 | | Do. |

OXYALKYLATION THEN ACYLATION

The prior oxyalkylated polyethyleneimine can be acylated with any of the acylation agents herein disclosed (in contrast to acylation prior to oxyalkylation). Since these reactants also have hydroxy groups, acylation, in addition to reaction with amino groups noted above, also includes esterification.

The method of acylation in this instance is similar to that carried out with polyethyleneimine itself, i.e., dehydration wherein the removal of water is a test of the completion of the reaction.

Example $1-O_1A_1$

One mole of $1-O_1$ (1120 grams) in 500 ml. of xylene is mixed with three moles of acetic acid (180 grams) at room temperature. The temperature is raised slowly to 120–130° C. and refluxed gently for one hour. The temperature is then raised to 150–160° C. and heated until 3 moles of water and all of the xylene are stripped off. The dark product is water-soluble.

Example $2-O_4A$ 0.1 mole of $2-O_4$ (380 grams) in 400 ml. of xylene is mixed with 0.1 mole of palmitic acid (25.6) grams at room temperature. Ratio 1 mole $2-O_4$ to 1 mole of palmitic acid. Vacuum is applied and the temperature is raised slowly until one mole of water (18 grams) is removed. This product is a dark viscous liquid.

Example $2-O_6A$ 0.1 mole of $2-O_6$ (757 grams) is mixed with 500 grams of xylene and heated to 100° C. 0.1 mole of diglycolic acid (13.4 grams) is added slowly to prevent excessive foaming. Ratio 1 mole $2-O_6$ to 1 mole glycolic acid. The temperature is raised to 140–150° C. and held until one mole of water has evolved. This product is the diglycolic acid fractional ester of $2-O_6$. A white precipitate forms during this reaction which can be removed by filtration. Analysis shows the precipitate to be sodium acid diglycolate, a reaction product of the catalyst and diglycolic acid. The filtered product is a dark viscous liquid at room temperature.

Table IV contains examples which further illustrate the invention. The symbol employed to designate oxyalkylated, acylated products is "OA."

TABLE IV.—ACYLATED, PRIOR OXYALKYLATED POLYETHYLENEIMINE

| Example | Acylating agent | Mols of acylating agent per mol oxyalkylated PE | Ratio of mols water removed to mols acylating agent employed | Physical properties |
|---|---|---|---|---|
| 1-$O_1A_1$ | Acetic | 3 | 1 | Dark viscous liquid. |
| 1-$O_1A_2$ | Lauric | 1 | 1 | Do. |
| 1-$O_3A$ | Acetic | 2 | 1 | Solid. |
| 2-$O_3A$ | Oleic | 3 | 1 | Do. |
| 2-$O_4A$ | Palmitic | 1 | 1 | Do. |
| 2-$O_6A$ | Diglycolic | 1 | 1 | Do. |
| 4-$O_2A$ | Stearic | 2 | 1 | Do. |
| 6-$O_1A$ | Maleic anhydride | 1 | | Viscous |
| 12-$O_2A$ | Myristic | 2 | 1 | Do. |
| 13-$O_3A$ | Abietic | 1 | 1 | Do. |
| 14-$O_6A$ | Palmitic | 2 | 1 | Do. |
| 15-$O_3A$ | Tall oil | 1 | 1 | Do. |
| 16-$O_5A$ | Diglycolic | 1 | 1 | Do. |
| 17-$O_3A$ | Oleic | 1 | 2 | Do. |
| 18-$O_5A$ | Lauric | 2 | 1 | Do. |
| 19-$O_1A$ | Ricinoleic | 1 | 1 | Do. |
| 20-$O_6A$ | Maleic anhydride | 1 | | Do. |
| 22-$O_5A$ | Linoleic | 3 | 1 | Do. |
| 23-$O_2A$ | Palmitic | 1 | 1 | Do. |
| 24-$O_4A$ | Acetic | 1 | 1 | Do. |
| 25-$O_3A_1$ | Dimeric | 1 | 1 | Solid. |
| 25-$O_3A_2$ | Diglycolic | 1 | 1 | Do. |
| 26-$O_1A$ | Diphenolic | 1 | 1 | Do. |
| 26-$O_5A$ | Terephthalic | 1 | 1 | Do. |
| 26-$O_6A$ | Benzoic | 1 | 1 | Do. |

The following table presents specific illustration of compounds other than polyethyleneimine and its derivatives.

TABLE IV-A.—ACYLATED, PRIOR OXYALKYLATED POLYPROPYLENEIMINE

| Example | Acylating agent | Mols of acylating agent per mol of oxyalkylated polypropyleneimine | Ratio mols of water removed to mols of acylating agent employed | Physical properties |
|---|---|---|---|---|
| 27-$O_2A$ | Oleic | 2 | 2 | Thick dark liquid. |
| 27-$O_4A$ | Diphenolic | 1 | 1 | Pasty solid. |
| 28-$O_3A$ | Lauric | 3 | 1 | Do. |
| 28-$O_5A$ | Acetic | 4 | 1 | Do. |
| 29-$O_2A$ | Naphthenic | 1 | 1 | Do. |
| 31-$O_2A$ | Stearic | 2 | 2 | Do. |
| 32-$O_4A$ | Tall oil | 1 | 1 | Do. |
| 37-$O_1A$ | Maleic anhydride | 1 | | Do. |
| 39-$O_2A$ | Palmitic | 2 | 2 | Do. |
| 43-$O_6A$ | Dimeric | 3 | 1 | Waxy solid. |
| 44-$O_5A$ | Diglycolic | 1 | 1 | Pasty solid. |
| 45-$O_1A$ | Myristic | 2 | 1 | Do. |
| 48-$O_3A$ | Ricinoleic | 1 | 1 | Do. |
| 50-$O_2A$ | Abietic | 2 | 2 | Do. |
| 51-$O_4A$ | Linoleic | 1 | 1 | Do. |
| 57-$O_3A$ | Nonanoic | 1 | 1 | Do. |
| 59-$O_5A$ | Lauric | 1 | 1 | Waxy solid. |
| 62-$O_2A$ | Diglycolic | 1 | 1 | Do. |

HEAT TREATMENT OF OXYALKYLATED PRODUCTS

The oxyalkylated products described herein, for example, those shown in Table II relating to oxyalkylated polyethyleneimine and those in Table III relating to oxyalkylated, prior acylated, polyethyleneimine can be heat treated to form useful compositions.

In general, the heat treatment is carried out at 200–250° C. Under dehydrating conditions, where reduced pressure and a fast flow of nitrogen is used, lower temperatures can be employed, for example 150–200° C. Water is removed during the reaction, such as by means of a side trap. Nitrogen passing through the reaction mixture and/or reduced pressure can be used to facilitate water removal.

The exact compositions cannot be depicted by the usual chemical formulas for the reason that the structures are subject to a wide variation.

The heat treatment is believed to result in the polymerization of these compounds and is effected by heating same at elevated temperatures, generally in the neighborhood of 200–270° C., preferably in the presence of catalysts, such as sodium hydroxide, potassium hydroxide, sodium ethylate, sodium glycerate, or catalysts of the kind commonly employed in the manufacture of superglycerinated fats, calcium chloride, iron and the like. The proportion of catalyst employed may vary from slightly less than 0.1%, in some instances, to over 1% in other instances.

Conditions must be such as to permit the removal of water formed during the process. At times the process can be conducted most readily by permitting part of the volatile constituents to distill, and subsequently subjecting the vapors to condensation. The condensed volatile distillate usually contains water formed by reaction. The water can be separated from such condensed distillate by any suitable means, for instance, distilling with xylene, so as to carry over the water, and subsequently removing the xylene. The dried condensate is then returned to the reaction chamber for further use. In some instances, condensation can best be conducted in the presence of a high-boiling solvent, which is permitted to distill in such a manner as to remove the water of reaction. In any event, the speed of reaction and the character of the polymerized product depend not only upon the original reactants themselves, but also on the nature and amount of catalyst employed, on the temperature employed, the time of reaction, and the speed of water removal, i.e., the effectiveness with which the water of reaction is removed from the combining mass. Polymerization can be effected without the use of catalysts in some instances, but such procedure is generally undesirable, due to the fact that the reaction takes a prolonged period of time, and usually a significantly higher temperature. The use of catalyst such as iron, etc., fosters the reaction.

The following examples are presented to illustrate heat treatment. The symbol used to designate a heat treated oxyalkylated polyethyleneimine is "OH" and an acylated, oxyalkylated product is "AOH." In all examples 500 grams of starting material are employed.

*Example 2-$O_1H$*

A conventional glass resin vessel equipped with a stirrer and water trap is used. Five hundred grams of 2-$O_1$ are charged into the above resin vessel along with five grams of $CaCl_2$. The temperature is raised to 225–250° C. and heated until 57 grams of water (3.2 mols) are evolved. This process takes 7.5 hours of heating. The product is an extremely viscous material at room temperature. However, upon warming slightly this product dissolves easily in water.

*Example 19-$O_3H$*

The process of the immediately previous example is repeated using 19-$O_3$ but substituting sodium methylate for calcium chloride. The product is a dark, viscous, water-soluble material.

*Example 15-$O_6H$*

The process of Example 2-$O_1H$ is repeated using 15-$O_6$ but substituting powdered iron for calcium chloride.

TABLE V.—HEAT TREATED (1) OXYALKYLATED AND (2) ACYLATED, OXYALKYLATED POLYETHYLENEIMINE

| Example | Reaction temp., °C. | Catalyst (5 grams) | Water removed | | Time in hours | Physical properties |
|---|---|---|---|---|---|---|
| | | | Grams | Mols | | |
| 1-$O_2H$ | 250 | Iron | 74 | 4.1 | 8.0 | Dark, viscous liquid. |
| 2-$O_1H$ | 225 | $CaCl_2$ | 57 | 3.2 | 16.5 | Do. |
| 3-$O_2H$ | 265 | Sodium methylate | 36 | 2.0 | 23 | Do. |
| 7-OH | 270 | $CaCl_2$ | 38 | 2.1 | 30 | Do. |
| 10-$O_2H$ | 255 | Iron | 95 | 5.3 | 9.5 | Solid. |
| 11-$O_1H$ | 240 | ----do---- | 32 | 1.8 | 12 | Viscous liquid. |
| 12-$O_3H$ | 260 | ----do---- | 40 | 2.2 | 13 | Do. |
| 13-$O_4H$ | 250 | $CaCl_2$ | 72 | 4 | 18 | Do. |
| 14-$O_1H$ | 200 | Iron oleate | 54 | 3 | 24 | Do. |
| 15-$O_6H$ | 265 | $CaCl_2$ | 90 | 5 | 30 | Do. |
| 16-$O_4H$ | 255 | Iron | 54 | 3 | 16 | Do. |
| 17-$O_1H$ | 235 | ----do---- | 36 | 2 | 18 | Do. |
| 19-$O_3H$ | 275 | Sodium methylate | 76 | 4.2 | 20 | Solid. |
| 20-$O_1H$ | 255 | Iron | 54 | 3 | 16 | Viscous liquid. |
| 22-$O_5H$ | 265 | ----do---- | 63 | 3.5 | 8 | Do. |
| 23-$O_3H$ | 255 | ----do---- | 57 | 3.2 | 12 | Do. |
| 24-$O_4H$ | 250 | ----do---- | 36 | 2 | 14 | Do. |
| 25-$O_2H$ | 260 | ----do---- | 38 | 2.1 | 11 | Do. |
| 26-$O_1H$ | 265 | ----do---- | 40 | 2.2 | 13 | Do. |
| 1-$A_5O_1H$ | 225 | Sodium methylate | 36 | 2.0 | 16 | Paste. |
| 5-$A_2OH$ | 240 | Iron | 40 | 2.2 | 8 | Do. |
| 11-$A_3O_1H$ | 235 | Iron oleate | 90 | 5 | 14 | Do. |
| 12-$A_2O_2H$ | 260 | $CaCl_2$ | 32 | 1.8 | 18 | Do. |

The following table presents specific illustration of compounds other than polyethyleneimine and its derivatives.

responding to the above examples. In addition, the halide may contain other elements besides carbon and hydrogen as, for example, where dichloroethylether is employed.

TABLE V-A.—HEAT TREATED (1) OXYALKYLATED AND (2) ACYLATED, OXYALKYLATED POLYPROPYLENEIMINE

| Example | Reaction temp., °C. | Catalyst (5 grams) | Water removed | | Time in hours | Physical properties |
|---|---|---|---|---|---|---|
| | | | Grams | Mols | | |
| 27-$O_3H$ | 260 | $CaCl_2$ | 32 | 1.8 | 18 | Dark, viscous liquid. |
| 28-$O_5H$ | 240 | Iron oleate | 40 | 2.2 | 8 | Do. |
| 29-$O_2H$ | 265 | Iron | 40 | 2.2 | 13 | Do. |
| 30-$O_1H$ | 250 | Sodium methylate | 36 | 2.0 | 14 | Do. |
| 32-$O_1H$ | 265 | Iron | 63 | 3.5 | 8 | Do. |
| 36-$O_3H$ | 275 | ----do---- | 76 | 4.2 | 20 | Do. |
| 37-$O_1H$ | 255 | ----do---- | 54 | 3.0 | 16 | Do. |
| 43-$O_3H$ | 200 | ----do---- | 54 | 3.0 | 24 | Pasty. |
| 46-$O_3H$ | 260 | ----do---- | 40 | 2.2 | 13 | Viscous liquid. |
| 47-$O_1H$ | 260 | Iron oleate | 95 | 5.3 | 9.5 | Do. |
| 48-$O_4H$ | 255 | Ferric chloride | 36 | 2.0 | 23 | Do. |
| 51-$O_3H$ | 270 | Iron | 74 | 4.1 | 8.0 | Do. |
| 52-$O_1H$ | 225 | Aluminum chloride | 32 | 1.8 | 18 | Do. |
| 55-$O_3H$ | 250 | $CaCl_2$ | 90 | 5.0 | 14 | Do. |
| 56-$O_4H$ | 235 | Sodium methylate | 36 | 2.0 | 16 | Do. |
| 58-$O_2H$ | 240 | Iron | 38 | 2.1 | 11 | Do. |
| 15-$A_2O_1H$ | 255 | ----do---- | 57 | 3.2 | 12 | Paste. |
| 17-$H_3O_2H$ | 245 | ----do---- | 54 | 3.0 | 16 | Do. |
| 19-$A_3O_1H$ | 270 | Iron oleate | 36 | 2.0 | 18 | Do. |
| 20-$A_1O_1H$ | 265 | $CaCl_2$ | 90 | 5.0 | 30 | Do. |
| 20-$A_1O_3H$ | 255 | Iron | 32 | 1.8 | 12 | Do. |

ALKYLATION

Alkylation relates to the reaction of polyethyleneimine and derivatives thereof with alkylating agents.

Any hydrocarbon halide, e.g., alkyl, alkenyl, cycloalkenyl, aralkyl, etc., halide which contains at least one carbon atom and up to about thirty carbon atoms or more per molecule can be employed to alkylate the products of this invention. It is especially preferred to use alkyl halides having between about one to about eighteen carbon atoms per molecule. The halogen portion of the alkyl halide reactant molecule can be any halogen atom, i.e., chlorine, bromine, fluorine, and iodine. In practice, the alkyl bromides and chlorides are used, due to their greater commercial availability. Non-limiting examples of the alkyl halide reactant are methyl chloride; ethyl chloride; propyl chloride; n-butyl chloride; sec-butyl iodide; t-butyl fluoride; n-amyl bromide; isoamyl chloride; n-hexyl bromide; n-hexyl iodide; heptyl fluoride; 2-ethyl-hexyl chloride; n-octyl bromide; decyl iodide; dodecyl bromide; 7-ethyl-2-methyl-undecyl iodide; tetradecyl bromide; hexadecyl bromide; hexadecyl fluoride; heptadecyl chloride; octadecyl bromide; docosyl chloride; tetracosyl iodide; hexacosyl bromide; octacosyl chloride; and triacontyl chloride. In addition, alkenyl halides can also be employed, for example, the alkenyl halides corresponding to the above examples. In addition, the halide may contain other elements besides carbon and hydrogen as, for example, where dichloroethylether is employed.

The alkyl halides can be chemically pure compounds or of commercial purity. Mixtures of alkyl halides, having carbon chain lengths falling within the range specified hereinbefore, can also be used. Examples of such mixtures are mono-chlorinated wax and mono-chlorinated kerosene. Complete instructions for the preparation of mono-chlorowax have been set forth in United States Patent 2,238,790.

Since the reaction between the alkyl halide reactant and polyethyleneimine is a condensation reaction, or an alkylation reaction, characterized by the elimination of hydrogen halide, the general conditions for such reactions are applicable herein. For certain uses it is preferable to carry out the reaction at temperatures of between about 100° and about 250° C., preferably between about 140° C. and about 200° C., in the presence of a basic material which is capable of reacting with the hydrogen halide to remove it. Such basic materials are, for example, sodium bicarbonate, sodium carbonate, pyridine, tertiary alkyl amines, alkali or alkaline earth metal hydroxides, and the like.

It is preferred to perform the reaction between the alkyl halide reactant and polyethyleneimine in a hydrocarbon solvent under reflux conditions. The aromatic hydrocarbon solvents of the benzene series are especially preferable. Non-limiting examples of the preferred solvent are benzene, toluene, and xylene. The amount of solvent used is a variable and non-critical factor. It is dependent on the size of the reaction vessel and on the reaction temperature selected. For example, it will be apparent that the amount of solvent used can be so great that the reaction temperature is lowered thereby.

The time of reaction between the alkyl halide reactant and polyethyleneimine is dependent on the weight of the charge, the reaction temperature selected, and the means employed for removing the hydrogen halide from the reaction mixture. In practice, the reaction is continued until no more hydrogen halide is formed. In general, the time of reaction will vary widely, such as between about four and about ten hours.

It can be postulated that the reaction between the alkyl halide reactant and polyethyleneimine results in the formation of products where the alkyl group of the alkyl halide has replaced a hydrogen atom attached to a nitrogen atom. It is also conceivable that alkylation of an alkylene group of polyethyleneimine can occur. However, the exact composition of any given reaction product cannot be predicted. For example, when two moles of butyl bromide are reacted with one mole of polyethyleneimine 900, a mixture of mono-, di- and tri- and higher N-alkylated products can be produced. Likewise, the alkyl groups can be substituted on different nitrogen atoms in different molecules of polyethyleneimine.

Thus, the term "alkylation" as employed herein and in the claims include alkenylation, cycloalkenylation, aralkylation, etc., and other hydrocarbonylation as well as alkylation itself.

In general, the following examples are prepared by reacting the alkyl halide with the polyethyleneimine at the desired ratio in the presence of one equivalent of base for each equivalent HCl given off during the reaction. Water formed during the reaction is removed by distillation. Where the presence of the anions, such as chlorine, bromine, etc., is not material and salts and quaternary compounds are desired, no base is added.

The following examples are presented to illustrate alkylation of polyethyleneimine.

In these examples, the term "mesomer" is employed. A mesomer is defined as a *repeating radical* which, when combined with other mesomers, forms the principal portion of the polymer molecule.

Thus, the unit

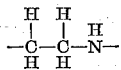

is the "mesomer" of polyethyleneimine, since polyethyleneimine may be represented by the formula

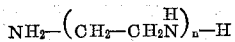

Example 5-K$_2$ 430 grams of polyethyleneimine 50,000, equivalent to 10 mesomeric units of ethyleneimine, in 500 ml. of xylene and 570 grams of sodium carbonate, equivalent to 8 moles, are placed in a reaction vessel equipped with a mechanical stirrer, a thermometer and a reflux condenser take-off for removal of volatile components. The stirred reactants are heated to about 100° C. whereupon 1140 g. (8 mols) of dichloroethyl ether is started in slowly at such a rate that the temperature of the reaction vessel contents never exceeds 165° C., but preferably stays around 135° C. The reaction is exothermic and 5-6 hours are required to add all the dichloroethyl ether. After all the dichloroethyl ether has been added, the temperature is allowed to drop to about 90-100° whereupon reduced pressure is applied to the reaction vessel and all xylene stripped out. The material left in the vessel is a thick brown liquid which solidifies upon cooling to a glassy-solid.

Example 8-A$_1$

The equivalent of 8 mesomeric units, based on polyethyleneimine, of the material 8-A$_1$ (Table 1) in 300 g. xylene is placed in a reaction vessel described in the above example for 5-K$_2$. 340 grams anhydrous sodium carbonate, equivalent to 3.2 moles are added followed by 1.6 moles dimethyl sulfate. The temperature is then brought up to 125° C. and held there for a period of 6-8 hours. Xylene is then removed under reduced temperature and pressure conditions as in the example for 5-K$_2$. The resulting product, a dark amber material, is very viscous at ordinary temperature.

Example 20-O$_1$HK

The equivalent of 10 mesomeric units based on polyethyleneimine of the material 20-O$_1$H (Table V) in 300 ml. of xylene and 420 grams sodium bicarbonate, equivalent to 5 moles, are placed in an autoclave equipped with a stirring device, a thermometer and a condenser reflux device which can be closed off from the autoclave during reactions in which pressures above atmosphere are experienced. The autoclave is closed and heat is applied to bring up the temperature to 120-130° C. at which time 5 mols methyl chloride are added slowly while never allowing pressure to exceed 5 atmospheres pressure. Several hours will be necessary to get all methyl chloride in and pressure inside the vessel down to one atmosphere. At this point the reflux condenser is opened, the temperature is allowed to drop to 90-100° C. and a slight vacuum applied in order to reflux the xylene out of the autoclave. The resulting material is a very viscous amber colored liquid.

The reactions shown in the following table are carried out in a similar manner. Each reaction in the table is carried out in two ways: (1) in the presence of base, as in 5-K$_2$ to yield the alkylation product and (2) in the absence of base to yield the halogen-containing or sulfate-containing (5-K$_2$X) products.

The alkylated products of this invention contain primary, secondary, tertiary, and quaternary amino groups. By controlling the amount of alkylation agent employed and the conditions of the reaction, etc., one can control the type and amount of alkylation. For example, by reaction less than the stoichiometric amount of alkylation agent one could preserve the presence of nitrogen-bonded hydrogen present on the molecule and by exhaustive alkylation in the presence of sufficient basic material, one can form more highly alkylated compounds.

The moles of alkylating agent reacted with polyethyleneimine will depend on the number of alkylation reactive positions contained therein as well as the number of moles of alkylating agent one wishes to incorporate into the molecule. Theoretically, every hydrogen bonded to a nitrogen atom can be alkylated. We have advantageously reacted 1-20 moles of alkylating agent per mole of polyethyleneimine 900 but preferably 1-12 moles. With polyethyleneimine 20,000 greater amounts of alkylating agent can be employed, for example 1-50 moles, and with polyethyleneimine 40,000, 1-100 moles, etc. Optimum alkylation will depend on the particular application.

In addition, the alkyl halide may contain functional groups. For example, chloroacetic acid can be reacted with polyethyleneimine to yield a compound containing carboxylic acid groups.

PN—CH$_2$COOH, wherein P is the residue of polyethyleneimine.

In addition, polyethyleneimine can be alkylated with an alkyl halide such as alkyl chloride and then reacted with chloroacetic acid to yield an alkylated polyethyleneimine containing carboxylic acid groups.

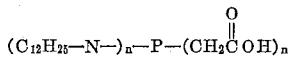

The symbol employed to designate an alkylated polyethyleneimine is "K." Where the product is a salt or a quaternary the symbol is "KX." Thus, for example, where no acceptor base is employed and a salt is allowed to form $1-A_5O_5K$ would be $1-A_5O_5KX$.

TABLE VI.—ALKYLATED PRODUCTS

| Ex. | Mol. wt. PE | Alkylating agent | Mols alkylating agent per mesomer unit | Physical properties |
|---|---|---|---|---|
| $1-K_1$ | 900 | Allyl chloride | 0.2 | Viscous liquid. |
| $1-K_2$ | 900 | do | 0.7 | Do. |
| $1-K_3$ | 900 | Benzyl chloride | 0.3 | Do. |
| $1-K_4$ | 900 | do | 0.8 | Solid. |
| $2-K_1$ | 5,000 | Methyl chloride | 0.3 | Viscous liquid. |
| $2-K_2$ | 5,000 | do | 1.0 | Solid. |
| $2-K_3$ | 5,000 | Ethylene dichloride | 0.2 | Viscous liquid. |
| $2-K_4$ | 5,000 | do | 0.5 | Do. |
| $3-K_1$ | 11,500 | 1,4-dichlorobutene-2 | 0.2 | Do. |
| $3-K_2$ | 11,500 | do | 0.5 | Do. |
| $3-K_3$ | 11,500 | Dimethyl sulfate | 0.2 | Do. |
| $3-K_4$ | 11,500 | do | 0.4 | Do. |
| $4-K_1$ | 20,000 | Dodecylbenzene chloride. | 0.2 | Solid. |
| $4-K_2$ | 20,000 | do | 0.5 | Do. |
| $4-K_3$ | 20,000 | Butyl chloride | 0.3 | Viscous liquid. |
| $4-K_4$ | 20,000 | do | 0.6 | Do. |
| $5-K_1$ | 50,000 | Dichlorodiethyl ether. | 0.2 | Do. |
| $5-K_2$ | 50,000 | do | 0.8 | Solid. |
| $5-K_3$ | 50,000 | Benzyl chloride | 0.3 | Viscous liquid. |
| $5-K_4$ | 50,000 | do | 0.8 | Solid. |
| $6-K_1$ | 100,000 | Ethylene dichloride | 0.2 | Viscous liquid. |
| $6-K_2$ | 100,000 | do | 0.8 | Do. |
| $6-K_3$ | 100,000 | Methyl chloride | 0.3 | Do. |
| $6-K_4$ | 100,000 | do | 1.0 | Solid. |
| $1-A_7K$ | | 1,4 xylidene chloride | 0.2 | Viscous liquid. |
| $2-A_1K$ | | do | 0.2 | Do. |
| $3-A_3K$ | | Dodecenyl chloride | 0.2 | Solid. |
| $4-A_1K$ | | Methyl chloride | 0.5 | Viscous liquid. |
| $6-A_4K$ | | Benzyl chloride | 0.4 | Solid. |
| $8-A_1K$ | | Dimethyl sulfate | 0.2 | Viscous liquid. |
| $12-A_2K$ | | Dichlorodiethyl ether. | 0.4 | Do. |
| $1-O_2K$ | | 1,4-dichlorobutene-2 | 0.3 | Do. |
| $2-O_1K$ | | Benzyl chloride | 0.4 | Solid. |
| $3-O_2K$ | | Methyl chloride | 0.7 | Do. |
| $4-O_1K$ | | Ethylene dichloride | 0.2 | Viscous liquid. |
| $6-O_2K$ | | Benzyl chloride | 0.4 | Solid. |
| $11-O_3K$ | | Dimethyl sulfate | 0.2 | Viscous liquid. |
| $14-O_1K$ | | Dichlorodiethyl ether. | 0.4 | Solid. |
| $16-O_4K$ | | Methyl chloride | 0.6 | Do. |
| $19-O_2K$ | | Dodecyl benzyl chloride. | 0.2 | Solid. |
| $19-O_4K$ | | 1,4 xylylene dichloride. | 0.2 | Viscous liquid. |
| $20-O_1K$ | | Benzyl chloride | 0.5 | Solid. |
| $22-O_5K$ | | Methyl chloride | 0.6 | Do. |
| $23-O_4K$ | | Dodecenyl chloride | 0.2 | Do. |
| $24-O_4K$ | | Ethylene dichloride | 0.3 | Viscous liquid. |
| $1-A_5O_1K$ | | 1,4 dichlorobutene-2 | 0.2 | Do. |
| $1-A_5O_5K$ | | Benzyl chloride | 0.4 | Solid. |
| $5-A_2OK$ | | Dichlorodiethyl ether. | 0.4 | Do. |
| $12-A_2O_2K$ | | Methyl chloride | 0.5 | Do. |
| $1-O_1A_1K$ | | Octadecyl chloride | 0.2 | Do. |
| $2-O_6AK$ | | Benzyl chloride | 0.4 | Do. |
| $14-O_6AK$ | | Dichlorodiethyl ether. | 0.3 | Viscous liquid. |
| $22-O_5AK$ | | Methyl chloride | 0.6 | Do. |
| $26-O_5AK$ | | Benzyl chloride | 0.6 | Solid. |
| $1-O_2HK$ | | do | 0.4 | Do. |
| $7-OHK$ | | Dichlorodiethyl ether. | 0.2 | Viscous liquid. |
| $11-O_1HK$ | | Ethylene dichloride | 0.2 | Do. |
| $20-O_1HK$ | | Methyl chloride | 0.5 | Do. |
| $25-O_2HK$ | | Dimethyl sulfate | 0.2 | Do. |

The following table presents specific illustrations of compounds other than polyethyleneimine and its derivatives.

TABLE VI-A.—ACYLATED PRODUCTS

| Example | Molecular weight of polypropyleneimine | Alkylating agent | Mols of alkylating agent per mesomer unit | Physical properties |
|---|---|---|---|---|
| $7-K_1$ | 500 | Allyl chloride | 0.2 | Viscous liquid. |
| $7-K_2$ | 500 | do | 0.7 | Do. |
| $7-K_3$ | 500 | Benzyl chloride | 0.3 | Do. |
| $7-K_4$ | 500 | do | 0.8 | Do. |
| $8-K_1$ | 1,000 | Methyl chloride | 0.7 | Do. |
| $8-K_2$ | 1,000 | do | 1.0 | Do. |
| $8-K_3$ | 1,000 | Ethylene dichloride. | 0.2 | Do. |
| $8-K_4$ | 1,000 | do | 0.5 | Do. |
| $9-K_1$ | 5,000 | 1-4-chlorobutene-2 | 0.2 | Do. |
| $9-K_2$ | 5,000 | do | 0.5 | Do. |
| $9-K_3$ | 5,000 | Dimethyl sulfate | 0.2 | Do. |
| $9-K_4$ | 5,000 | do | 0.4 | Do. |
| $10-K_1$ | 10,000 | Dodecylbenzene chloride. | 0.2 | Solid. |
| $10-K_2$ | 10,000 | do | 0.5 | Do. |
| $10-K_3$ | 10,000 | Butyl chloride | 0.3 | Do. |
| $10-K_4$ | 10,000 | do | 0.6 | Do. |
| $11-K_1$ | 20,000 | Dichlorodiethyl ether. | 0.2 | Do. |
| $11-K_2$ | 20,000 | do | 0.8 | Do. |
| $11-K_3$ | 20,000 | Benzyl chloride | 0.3 | Do. |
| $11-K_4$ | 20,000 | do | 0.8 | Do. |
| $12-K_1$ | 40,000 | Methyl chloride | 0.3 | Do. |
| $12-K_2$ | 40,000 | do | 0.8 | Do. |
| $12-K_3$ | 40,000 | Allyl chloride | 0.5 | Do. |
| $15-A_2K$ | | Dimethyl sulfate | 0.8 | Viscous liquid. |
| $16-A_3K$ | | Methyl chloride | 0.3 | Do. |
| $17-A_1K$ | | Ethylene dichloride. | 0.8 | Do. |
| $18-A_3K$ | | Dichlorodiethyl ether. | 0.2 | Solid. |
| $19-A_2K$ | | Benzyl chloride | 0.6 | Do. |
| $20-A_1K$ | | 1-4-dichlorobutene-2. | 0.3 | Do. |
| $27-O_4K$ | | Dodecenyl chloride. | 0.5 | Viscous liquid. |
| $28-O_2K$ | | Benzyl chloride | 0.2 | Do. |
| $29-O_3K$ | | 1,4 xylylene dichloride. | 1.0 | Do. |
| $36-O_4K$ | | Dodecyl benzene chloride. | 0.8 | Do. |
| $44-O_5K$ | | Dimethyl sulfate | 0.3 | Solid. |
| $50-O_2K$ | | Ethylene dichloride. | 0.7 | Do. |
| $51-O_2K$ | | Butyl chloride | 0.2 | Do. |
| $55-O_3K$ | | Allyl chloride | 0.5 | Do. |
| $61-O_2K$ | | Benzyl chloride | 0.3 | Viscous |
| $15-A_2O_1K$ | | Methyl chloride | 1.0 | Solid. |
| $19-A_3O_1K$ | | Ethylene dichloride. | 0.6 | Do. |
| $19-A_3O_3K$ | | Dichloro pentane | 0.5 | Do. |
| $27-O_2AK$ | | Dichlorodiethyl ether. | 0.2 | Do. |
| $44-O_5AK$ | | Dimethyl sulfate | 1.0 | Do. |
| $51-O_4AK$ | | Methyl chloride | 0.8 | Do. |
| $46-O_3HK$ | | Allyl chloride | 0.5 | Do. |
| $20-A_1O_2HK$ | | Butyl chloride | 0.2 | Do. |

In addition to the above examples wherein a base acceptor is employed to remove the acid anion such as halogen, sulfate, etc., the above examples are also prepared omitting the inorganic base from the reaction medium. When this is done, a halogen containing salt, quaternary, etc., is formed. Examples where such salts are formed will be designated as above except that they will contain an "X" designation for example instead of $1-O_1A_1K$ they will be $1-O_1A_1KX$, and instead of $22-O_5AK$ they will be $22-O_5AKX$, etc. "X" indicates salt formation.

ALKYLATED THEN ACYLATION

The alkylated material prepared above can be further treated with acylating agent where residual acylatable amino groups are still present on the molecule. The acylation procedure is essentially that described above wherein carboxylic acids react with the alkylated polyethyleneimine under dehydrating conditions to form amides and cyclic amidines. The product depends on the ratio of moles of water removed for each carboxylic acid group, i.e., 1 mole water/1 mole carboxylic essentially amides; more than 1 mole water/1 mole carboxylic acid group, essentially cyclic amidines, such as imidazolines.

Such compounds are illustrated in the following table. The symbol employed to designate alkylated, acylated products is "KA" and acylated, alkylated, acylated products is "AKA."

TABLE VII.—ACYLATED, PRIOR ALKYLATED POLYETHYLENEIMINE OR DERIVATIVE

| Example | Acylating agent | Ratio mols acylating agent per mol PE deriv. | Mols of water removed per mole of reactant | Physical properties |
|---|---|---|---|---|
| 1-K$_2$A | Lauric | 4:1 | 1 | Viscous liquid. |
| 2-K$_3$A | Oleic | 1:1 | 1.5 | Do. |
| 3-K$_1$A | Palmitic | 1:1 | 1 | Do |
| 4-K$_4$A | Dimeric | 0.5:1 | 1 | Solid. |
| 5-K$_1$A | Nonanoic | 2:1 | 1 | Viscous liquid. |
| 5-K$_2$A | Ricinoleic | 2:1 | 1.8 | Do. |
| 5-K$_3$A | Succinic anhydride alkyl (C$_{12}$). | 2:1 | 1 | Do. |
| 5-K$_4$A | Stearic | 1:1 | 1.5 | Solid. |
| 6-K$_3$A | Myristic | 2:1 | 1 | Viscous liquid. |
| 2-A$_4$KA | Acetic | 2:1 | 1 | Do. |
| 6-A$_4$KA | Diglycolic | 1:1 | 1 | Do. |
| 2-O$_1$KA | Lauric | 2:1 | 1 | Viscous liquid. |
| 1-O$_2$KA | Oleic | 2:1 | 1.3 | Do. |
| 1-O$_2$HKA | Maleic anhydride. | 1:1 | | Solid. |

The following table presents specific illustrations of compounds other than polyethyleneimine and its derivatives.

TABLE VII-A.—ACYLATED, PRIOR ALKYLATED POLYPROPYLENEIMINE OR DERIVATIVE

| Example | Acylating agent | Ratio mols of acylating agent per mol of polypropyleneimine derivative | Mols of water removed per mol of reactant | Physical properties |
|---|---|---|---|---|
| 7-K$_2$A | Myristic | 2:1 | 1 | Viscous liquid. |
| 8-K$_3$A | Acetic | 2:1 | 1 | Do. |
| 9-K$_1$A | Diglycolic | 1:1 | 1 | Do. |
| 10-K$_4$A | Lauric | 2:1 | 1 | Do. |
| 11-K$_2$A | Oleic | 2:1 | 1.3 | Do. |
| 12-K$_1$A | Maleic anhydride. | 1:1 | | Solik. |
| 16-A$_3$KA | Lauric | 4:1 | 1 | Viscous liquid. |
| 20-A$_1$KA | Oleic | 1:1 | 1.5 | Do. |
| 28-O$_2$KA | Palmitic | 1:1 | 1 | Do. |
| 44-O$_5$KA | Dimeric | 0.5:1 | 1 | Do. |
| 61-O$_2$KA | Nonanoic | 2:1 | 1 | Do. |
| 15-A$_3$O$_4$KA | Ricinoleic | 2:1 | 1.8 | Do. |
| 19-A$_3$O$_3$KA | Alkyl succinic anhydride (C$_{12}$). | 2:1 | | Solid. |
| 44-O$_5$AKA | Stearic | 1:1 | 1 | Viscous liquid. |
| 46-O$_3$HKA | Myristic | 2:1 | 1 | Do. |
| 20-A$_1$O$_2$HKA | Acetic | 1:1 | 1 | Do. |

OLEFINATION

Olefination relates to the reaction of polyethyleneimine and derivatives with olefins.

The compositions of this invention, including polyethyleneimine itself as well as reaction products thereof containing active hydrogens, can be reacted with unsaturated compounds, particular compounds containing activated double bonds, so as to add polyethyleneimine across the double bonds as illustrated herein:

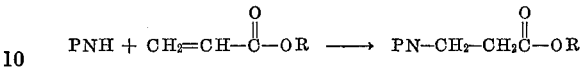

Where the compound contains an additional active hydrogen, other unsaturated molecules can be added to the original molecule for example:

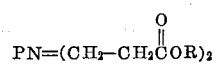

Where one or more active hydrogens are present at another reactive site, the following reaction could take place:

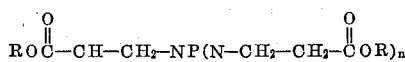

The reaction is carried out in the conventional manner such as illustrated, for example, in "Synthetic Organic Chemistry," Wagner & Zook (Wiley 1952), page 673.

Non-limiting examples of unsaturated compounds which can be reacted with the polyamine and derivatives thereof including the following: acrylonitrile, acrylic and methacrylic acids and esters crotonic acid and esters, cinnamic acid and esters, styrene, styrene derivatives and related compounds, butadiene, vinyl ethers, vinyl ketones, maleic esters, vinyl sulfones, etc.

In addition, polyethyleneimine and derivatives thereof containing active hydrogens can be used to prepare telomers of polymer prepared from vinyl monomers.

The following are examples of olefination. The symbol employed to designate olefination is "U" and alkylation, olefination "KU."

Example 1–U$_1$

The olefination reaction is carried out in the usual glass resin apparatus. Since the reaction is that of a double bond with an active hydrogen, no water is eliminated. The reaction is relatively simple, as shown by the following example:

Charge 900 grams of polyethyleneimine 900 in xylene (1 mol) into glass resin apparatus. Care should be taken that the PEI 900 is water-free, to eliminate undesirable side reactions. At room temperature, slowly add 53 grams of acrylonitrile (1 mole). The reaction proceeds smoothly without the aid of a catalyst. Warm gently to 80–100° C. and stir for one hour.

Example 6–U$_1$

To 1,000 grams of polyethyleneimine 100,000 (0.01 mol) in 300 grams of xylene, add 1.24 grams of divinyl sulfone (0.01 mol) at room temperature. This reaction is exothermic and the ambient temperature is employed.

Example 2–O$_1$KAU

Same reactions as Example 1–U except that 1 mol of methyl acrylate is substituted for acylonitrile and 2–O$_1$KA is substituted for the polyethyleneimine 900. Part of this product is thereupon saponified with sodium hydroxide to form the fatty amino acid salt.

Further examples of the reaction are summarized in the following table:

TABLE VIII.—OLEFINATION

| Example | Mol. weight of polyethyleneimine | Olefin | Mols of olefin per mol PE | Time | Temp., °C. |
|---|---|---|---|---|---|
| 1-U$_1$ | 900 | Acrylonitrile | 1:1 | 1 hr | 80-100 |
| 1-U$_2$ | 900 | Methylacrylate | 2:1 | 1 hr | 80-100 |
| 1-U$_3$ | 900 | Styrene | 3:1 | 2 hrs | 90 |
| 2-U$_1$ | 5,000 | Ethyl cinnamate | 2:1 | 3 hrs | 120 |
| 2-U$_2$ | 5,000 | Ethyl crotonate | 2:1 | 3 hrs | 125 |
| 2-U$_3$ | 5,000 | Dioctyl maleate | 2:1 | 2 hrs | 100 |
| 3-U$_1$ | 11,500 | Divinyl sulfone | 1:1 | 1 hr | 70 |
| 3-U$_2$ | 11,500 | Styrene | 1:1 | 30 min | 90 |
| 3-U$_3$ | 11,500 | Lauryl methacrylate | 2:1 | 3 hrs | 135 |
| 4-U$_1$ | 20,000 | Divinyl sulfone | 1:1 | 1 hr | 80-100 |
| 4-U$_2$ | 20,000 | Methyl methacrylate | 1:1 | 1 hr | 80-100 |
| 4-U$_3$ | 20,000 | Acrylonitrile | 3:1 | 30 min | 80-100 |
| 5-U$_1$ | 50,000 | Methylacrylate | 3:1 | 1 hr | 80-100 |
| 5-U$_2$ | 50,000 | Acrylonitrile | 3:1 | 1 hr | 80-100 |
| 5-U$_3$ | 50,000 | Styrene | 3:1 | 1 hr | 90 |
| 6-U$_1$ | 100,000 | Divinyl sulfone | 1:1 | 1 hr | 70 |
| 6-U$_2$ | 100,000 | Ethyl crotonate | 2:1 | 2 hrs | 125 |
| 6-U$_3$ | 100,000 | Dioctyl maleate | 2:1 | 1 hr | 100 |

| Example | Olefin | Mols of olefin Mol PE | Time | Temp., °C. |
|---|---|---|---|---|
| 1-A$_6$U | Styrene | 1:1 | 1 hour | 90 |
| 2-A$_4$U | Divinyl sulfone | 1:1 | do | 70 |
| 3-A$_4$U | Methylacrylate | 1:1 | do | 80-100 |
| 6-A$_4$U | Divinyl sulfone | 1:1 | do | 70 |
| 8-A$_2$U | Styrene | 3:1 | 2 hours | 90 |
| 13-A$_1$U | Dimethyl maleate | 1:1 | 1 hour | 100 |
| 1-O$_1$U | Dioctyl maleate | 2:1 | do | 100 |
| 2-O$_1$U | Ethyl crotonate | 2:1 | 2 hours | 125 |
| 3-O$_1$U | Divinyl sulfone | 1:1 | 1 hour | 70 |
| 4-O$_1$U | Styrene | 4:1 | do | 90 |
| 19-O$_1$U | Acrylonitrile | 3:1 | do | 80-100 |
| 20-O$_1$U | Methylacrylate | 3:1 | do | 80-100 |
| 22-O$_5$U | Acrylonitrile | 3:1 | 30 min | 80-100 |
| 23-O$_1$U | Methyl methacrylate | 1:1 | 1 hour | 80-100 |
| 24-O$_1$U | Divinyl sulfone | 1:1 | do | 70 |
| 1-A$_5$O$_1$U | Lauryl methacrylate | 2:1 | 3 hours | 135 |
| 23-O$_2$AU | Divinyl sulfone | 1:1 | 1 hour | 70 |
| 14-O$_1$HU | Dioctyl maleate | 2:1 | 2 hours | 100 |
| 4-K$_4$U | Ethyl crotonate | 2:1 | 3 hours | 125 |
| 4-K$_4$AU | Ethyl cinnamate | 2:1 | do | 120 |
| 2-A$_4$KAU | Styrene | 3:1 | 2 hours | 90 |
| 2-O$_1$KAU | Methylacrylate | 2:1 | 1 hour | 80-100 |
| 1-O$_2$HKAU | Acrylonitrile | 1:1 | do | 80-100 |

The following table presents specific illustration of compounds other than polyethyleneimine and its derivatives.

TABLE VIII-A.—OLEFINATION OF POLYPROPYLENEIMINE

| Example | Molecular weight of polypropyleneimine | Olefin | Mols of olefin per mol of polypropyleneimine | Time in hours | Temp., °C. |
|---|---|---|---|---|---|
| 7-U$_1$ | 500 | Styrene | 1:1 | 1 | 90 |
| 7-U$_2$ | 500 | Divinyl sulfone | 1:1 | 1 | 70 |
| 7-U$_3$ | 500 | Acrylonitrile | 2:1 | 1 | 80-100 |
| 8-U$_1$ | 1,000 | Dioctyl maleate | 1:1 | 2 | 120 |
| 8-U$_2$ | 1,000 | Methylacrylate | 1:1 | 1 | 110 |
| 8-U$_3$ | 1,000 | Ethyl cinnamate | 3:1 | 2 | 125 |
| 9-U$_1$ | 5,000 | Lauryl methacrylate | 1:1 | 3 | 130 |
| 9-U$_2$ | 5,000 | Ethyl crotonate | 1:1 | 3 | 120 |
| 9-U$_3$ | 5,000 | Acrylonitrile | 4:1 | 1 | 80-100 |
| 10-U$_1$ | 10,000 | Styrene | 2:1 | 1 | 90 |
| 10-U$_2$ | 10,000 | Divinyl sulfone | 1:1 | 1 | 80 |
| 10-U$_3$ | 10,000 | Methylacrylate | 2:1 | 1 | 100 |
| 11-U$_1$ | 20,000 | Lauryl methacrylate | 1:1 | 3 | 110 |
| 11-U$_2$ | 20,000 | Styrene | 2:1 | 1 | 90 |
| 11-U$_3$ | 20,000 | Divinyl sulfone | 1:1 | 1 | 80 |
| 12-U$_1$ | 40,000 | Methyl acrylate | 2:1 | 2 | 120 |
| 12-U$_2$ | 40,000 | Acrylonitrile | 3:1 | 1 | 80 |
| 12-U$_3$ | 40,000 | Dioctyl maleate | 1:1 | 4 | 110 |

CARBONYLATION

Carbonylation relates to the reaction of polyethyleneimine and derivatives thereof with aldehydes and ketones.

Where primary amino groups are present on the polyethyleneimine reactants, Schiff's bases can be formed on reaction with carbonyl compounds. For example, where an aldehyde such as salicylaldehyde is reacted with polyethyleneimine 900 in a ratio of 2 moles of aldehyde to 1 mole of PE 900, the folloiwng type of compound could be formed:

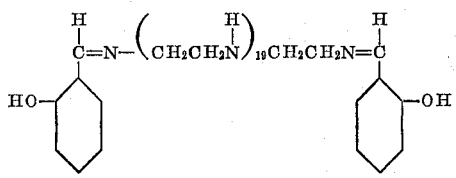

Lesser molar ratios of aldehyde to polyamine would yield mono- Schiff's base such as

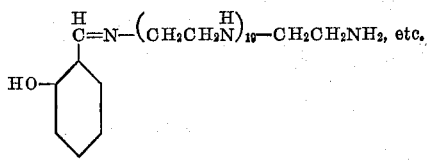

and other isomeric configurations, such as where the Schiff's base is present on the non-terminal amino group rather than on the terminal amino group, etc.

A wide variety of aldehyde may be employed such as aliphatic, aromatic, cycloaliphatic, heterocyclic, etc., including substituted derivatives such as those containing aryloxy, halogen, heterocyclic, amino, nitro, cyano, carboxyl, etc. groups thereof. Non-limiting examples are the following:

Aldehydes

Benzaldehyde
2-methylbenzaldehyde
3-methylbenzaldehyde
4-methylbenzaldehyde
2-methoxybenzaldehyde
4-methoxybenzaldehyde
a-naphthaldehyde
b-napthaldehyde
4-phenylbenzaldehyde
Propionaldehyde
n-Butyraldehyde
Heptaldehyde
Aldol
2-hydroxybenzaldehyde
2-hydroxy-6-methylbenzaldehyde
2-hydroxy-3-methoxybenzaldehyde
2-4-dihydroxybenzaldehyde
2-6-dihydroxybenzaldehyde
2-hydroxynaphthaldehyde-1
1-hydroxynaphthaldehyde-2
Anthrol-2-aldehyde-1
2-hydroxyfluorene-aldehyde-1
4-hydroxydiphenyl-aldehyde-3
3-hydroxyphenanthrene-aldehyde-4
1-3-dihydroxy-2-4-dialdehydebenzene
2-hydroxy-5-chlorobenzaldehyde
2-hydroxy-3:5-dibromobenzaldehyde
2-hydroxy-3-nitrobenzaldehyde
2-hydroxy-3-cyanobenzaldehyde
2-hydroxy-3-carboxybenzaldehyde
4-hydroxypyridine-aldehyde-3
4-hydroxyquinoline-aldehyde-3
7-hydroxyquinoline-aldehyde-8
Formaldehyde
Glyoxal
Glyceraldehyde Schiff's bases are prepared with the polyethyleneimines of this invention in a conventional manner such as described in "Synthetic Organic Chemistry," by Wagner & Zook (1953 Wiley), pages 728–9.

Where more extreme conditions are employed, the products may be more complex wherein the carbonyl reactant instead of reacting intramolecularly in the case of a Schiff's base may react intermolecularly so as to act as a bridging means between two or more polyethyleneimine compounds, thus increasing the molecular weight of the polyethyleneimine as schematically shown below in the case where formaldehyde is the carbonyl compound:

$$-P-(CH_2-P)_n-CH_2-$$

In addition to increasing the molecular weight by means of aldehydes, these compounds result in the formation of cyclic compounds. Probably both molecular weight increase and cyclization occur during the reaction.

The following examples illustrate the reaction of carbonyl compounds with polyethyleneimines. The symbol employed to designate carbonylation is "C," acylation, carbonylation "AC," and alkylation, carbonylation "KC."

Example 1–$C_1$

Charge 900 grams of polyethyleneimine 900 and 900 grams of xylene into a conventional glass resin apparatus fitted with a stirrer, thermometer and side-arm trap. Raise temperature to 90° C. and slowly add 44 grams of acetaldehyde (1 mol). Hold at this temperature for three hours. Vacuum is then applied until all xylene is stripped off. The reaction mass is a thick dark liquid which is soluble in water.

Example 5–$C_1$

Using the same apparatus as above, charge 500 g. (0.1) of polyethyleneimine 5,000. While stirring, add slowly at room temperature 8.2 grams of 37% aqueous formaldehyde (0.1 mol of HCHO). After the reaction has ceased, raise temperature to 100° C. The reaction mass may be stopped at this point. It is a viscous water-soluble material. However, it is possible to continue heating under vacuum until all of the water has been eliminated. Cross-linking occurs with this procedure and care must be taken to prevent insolubilization.

Further examples of this reaction are summarized in the following table:

TABLE IX.—CARBONYLATION

| Example | Mol. weight of polyethyl-eneimine | Aldehyde | Mol ratio aldehyde to polyethyl-eneimine or deriv. | Temp., °C. | Time |
|---|---|---|---|---|---|
| 1-$C_1$ | 900 | Acetaldehyde | 1:1 | 90 | 3 hours. |
| 1-$C_2$ | 900 | do | 2:1 | 90 | Do. |
| 1-$C_3$ | 900 | do | 3:1 | 90 | Do. |
| 2-$C_1$ | 5,000 | Heptaldehyde | 5:1 | 125 | 4 hours. |
| 2-$C_2$ | 5,000 | do | 3:1 | 125 | Do. |
| 2-$C_3$ | 5,000 | do | 1:1 | 125 | Do. |
| 3-$C_1$ | 11,500 | Glyoxal | 2:1 | 80 | 1 hour. |
| 3-$C_2$ | 11,500 | do | 1:1 | 80 | Do. |
| 3-$C_3$ | 11,500 | do | 0.5:1 | 80 | Do. |
| 4-$C_1$ | 20,000 | Salicylaldehyde | 6:1 | 140 | 3 hours. |
| 4-$C_2$ | 20,000 | do | 5:1 | 140 | Do. |
| 4-$C_3$ | 20,000 | do | 3:1 | 140 | Do. |
| 5-$C_1$ | 50,000 | Formaldehyde | 3:1 | (1) | 1 hour. |
| 5-$C_2$ | 50,000 | do | 2:1 | (1) | Do. |
| 5-$C_3$ | 5,000 | do | 2:1 | (1) | Do. |
| 6-$C_1$ | 100,000 | Glyceraldehyde | 6:1 | 125 | 5 hours. |
| 6-$C_2$ | 100,000 | do | 3:1 | 125 | Do. |
| 6-$C_3$ | 100,000 | do | 2:1 | 125 | Do. |
| 1-$A_7C$ | 100,000 | Salicylaldehyde | 3:1 | 120 | 2 hours. |
| 2-$A_4C$ | 100,000 | do | 2:1 | 120 | Do. |
| 4-$A_3C$ | 100,000 | do | 1:1 | 120 | Do. |
| 6-$A_4C$ | 100,000 | Benzaldehyde | 3:1 | 110 | 1 hour. |
| 8-$A_3C$ | 100,000 | do | 2:1 | 110 | Do. |

| Example | Aldehyde | Mol ratio aldehyde to polyethyl-eneimine | Temp. °C. | Time |
|---|---|---|---|---|
| 1-$O_1C$ | Benzaldehyde | 1:1 | 110 | 1 hour. |
| 2-$O_1C$ | Glyoxal | 3:1 | 100 | 2 hours. |
| 3-$O_1C$ | do | 2:1 | 100 | Do. |
| 19-$O_1C$ | do | 1:1 | 100 | Do. |
| 20-$O_1C$ | Formaldehyde | 3:1 | (2) | 1 hour. |
| 22-$O_5C$ | do | 2:1 | (2) | Do. |
| 1-$A_5O_1C$ | do | 1:1 | (2) | Do. |
| 1-$A_5O_6C$ | Glyceraldehyde | 3:1 | 130 | 4 hours. |
| 6-$A_4OC$ | do | 2:1 | 130 | Do. |
| 12-$O_2AC$ | Furfuraldehyde | 3:1 | 100 | 1 hour. |
| 17-$O_3AC$ | do | 2:1 | 100 | Do. |
| 26-$O_1AC$ | do | 1:1 | 100 | Do. |
| 1-$O_2HC$ | Heptaldehyde | 3:1 | 140 | 6 hours. |
| 1-$K_1C$ | do | 2:1 | 140 | Do. |
| 5-$K_2C$ | do | 1:1 | 140 | Do. |
| 1-$K_2AC$ | Formaldehyde | 3:1 | (2) | 1 hour. |
| 5-$U_1C$ | do | 2:1 | (2) | Do. |
| 3-$O_1UC$ | do | 1:1 | (2) | Do. |

[1] Start at 25° C. Raise to 100° C.
[2] Start 25° C. Raise to 90° C.

The following table presents specific illustration of compounds other than polyethyleneimine and its derivatives.

TABLE IX-A.—CARBONYLATION

| Example | Molecular weight of polypropyl-eneimine | Aldehyde | Mol ratio aldehyde to Polypropyl-eneimine | Temp., °C. | Time in hours |
|---|---|---|---|---|---|
| 7-$C_1$ | 500 | Benazldehyde | 1:1 | 110 | 1 hour. |
| 7-$C_2$ | 500 | do | 2:1 | 110 | Do. |
| 7-$C_3$ | 500 | do | 3:1 | 110 | Do. |
| 8-$C_1$ | 1,000 | Salicylaldehyde | 4:1 | 120 | Do. |
| 8-$C_2$ | 1,000 | do | 3:1 | 120 | Do. |
| 8-$C_3$ | 1,000 | do | 2:1 | 120 | Do. |
| 9-$C_1$ | 5,000 | Formaldehyde | 2:1 | 90 | Do. |
| 9-$C_2$ | 5,000 | do | 1:1 | 90 | Do. |
| 9-$C_3$ | 5,000 | do | 0.5:1 | 90 | Do. |
| 10-$C_1$ | 10,000 | Glyoxal | 2:1 | 90 | Do. |
| 10-$C_2$ | 10,000 | do | 1:1 | 90 | Do. |
| 10-$C_3$ | 10,000 | do | 0.5:1 | 90 | Do. |
| 11-$C_1$ | 20,000 | Acetaldehyde | 3:1 | 100 | 2 hours. |
| 11-$C_2$ | 20,000 | do | 2:1 | 100 | Do. |
| 11-$C_3$ | 20,000 | do | 1:1 | 100 | Do. |
| 12-$C_1$ | 40,000 | Heptaldehyde | 4:1 | 130 | 3 hours. |
| 12-$C_2$ | 40,000 | do | 3:1 | 130 | Do. |
| 12-$C_3$ | 40,000 | do | 2:1 | 130 | Do. |

TABLE IX-A.—CARBONYLATION—Continued

| Example | Aldehyde | Mol ratio of aldehyde to polypropyleneimine or derivative | Temp. °C. | Time in Hours |
|---|---|---|---|---|
| 15-A$_3$C | Glyceraldehyde | 3:1 | 125 | 4 |
| 18-A$_3$C | Heptaldehyde | 2:1 | 125 | 4 |
| 20-A$_2$C | Furfuraldehyde | 1:1 | 100 | 2 |
| 27-O$_1$C | Glyoxal | 1:1 | 90 | 1 |
| 28-O$_2$C | Benzaldehyde | 4:1 | 120 | 2 |
| 29-O$_3$C | Formaldehyde | 1:1 | (1) | 1 |
| 43-O$_2$C | Acetaldehyde | 1:1 | 100 | 2 |
| 15-A$_3$O$_2$C | ----do---- | 2:1 | 100 | 2 |
| 20-A$_1$O$_2$C | ----do---- | 3:1 | 100 | 2 |
| 32-O$_4$AC | Salicylaldehyde | 1:1 | 130 | 3 |
| 51-O$_4$AC | ----do---- | 2:1 | 130 | 3 |
| 32-O$_1$HC | ----do---- | 3:1 | 130 | 3 |
| 15-A$_2$O$_1$HC | Benzaldehyde | 3:1 | 125 | 2 |
| 8-K$_1$C | ----do---- | 2:1 | 125 | 2 |
| 12-K$_2$C | ----do---- | 1:1 | 125 | 2 |
| 10-K$_4$AC | Glyoxal | 2:1 | 100 | 1 |
| 61-O$_2$KAC | ----do---- | 1:1 | 100 | 1 |
| 20-A$_1$O$_2$KAC | ----do---- | 0.5:1 | 100 | 1 |
| 7-U$_2$C | Formaldehyde | 2:1 | 70 | 1 |
| 12-U$_3$C | ----do---- | 1:1 | 70 | 1 |

[1] Start at 25° C. Raise to 100° C.

The examples presented above are non-limiting examples. It should be clearly understood that various other combinations, order of reactions, reaction ratios, multiplicity of additions, etc., can be employed. Where additional reactive groups are still present on the molecule, the reaction can be repeated with either the original reactant or another reactant.

The type of compound prepared is evident from the letters assigned to the examples. Thus, taking the branched polyamine as the starting material, the following example designations have the following meaning:

Example designation:         Meaning
- (1) A _____ Acylated.
- (2) AO _____ Acylated, then oxyalkylated.
- (3) AOA _____ Acylated, then oxyalkylated then acrylated.
- (4) AOH _____ Acylated, then oxyalkylated, then heat treated.
- (5) AX _____ Salt or quaternary of (1).
- (6) AOX _____ Salt or quaternary of (2).
- (7) AOAX ____ Salt or quaternary of (3).
- (8) AOHX ____ Salt or quaternary of (4).
- (9) O _____ Oxyalkylated.
- (10) OA _____ Oxyalkylated, then acylated.
- (11) OH _____ Oxyalkylated, then heat treated.
- (12) K _____ Alkylated.
- (13) KX _____ Salt or quaternary of (12).
- (14) KA _____ Alkylated, then acylated.
- (15) AK _____ Acylated, then alkylated.
- (16) AKX ____ Salt or quaternary of (15).
- (17) OK _____ Oxyalkylated, then alkylated.
- (18) OKX ____ Salt or quaternary of (17).
- (19) C _____ Carbonylated.
- (20) AC _____ Acylated, then carbonylated.
- (21) KC _____ Alkylated, then carbonylated.
- (22) CO _____ Carbonylated, then oxyalkylated.
- (23) U _____ Olefinated.
- (24) AU _____ Acylated, then olefinated.
- (25) KU _____ Alkylated, then olefinated.
- (26) KUX ____ Salt or quaternary of (25).

In addition to polyethyleneimine itself, other polyalkyleneimines can be employed, a typical example of which is polypropyleneimines. Propyleneimine is now commercially available and can be polymerized to the polymer and polypropyleneimines can then be reacted in a manner similar to those reactions shown above. Thus, the teachings contained herein also apply to other polyalkyleneimines besides polyethyleneimine and derivatives thereof.

USE AS A CHELATING AGENT

This phase of the invention relates to the use of the compounds of our invention as chelating agents and to the chelates thus formed.

Chelation is a term applied to designate cyclic structures arising from the combination of metallic atoms with organic or inorganic molecules or ions. Chelates are very important industrially because one of the unusual features of the chelate ring compounds is their unusual stability in which respect they resemble the aromatic rings of organic chemistry. Because of the great affinity of chelating compounds for metals and because of the great stability of the chelates they form, they are very important industrially.

The compositions of this invention are excellent chelating agents. They are particularly suitable for forming chelates of great stability with a wide variety of metals.

Chelating metals comprise magnesium, aluminum, arsenic, antimony, chromium, iron, cobalt, nickel, palladium, and platinum. Particularly preferred of such metals as chelate constituents are iron, nickel, copper and cobalt.

The chelates formed from the compositions of our invention are useful as bactericidal and fungicidal agents, particularly in the case of the copper chelates. In addition the chelates can be employed to stabilize hydrocarbon oils against the deleterious effects of oxidation.

In general, these chelates are prepared by adding a sufficient amount of a metal salt to combine with a compound of this invention. They are prepared by the general method described in detail by Hunter and Marriott in the Journal of the Chemical Society (London) 1937, 2000, which relates to the formation of chelates from metal ions and salicylidene imines.

The following examples are illustrative of the preparation of chelates.

*Example 1-A$_7$*

An aqueous 0.1 mole solution of the chelating agent of Example 1-A$_7$ is added to an aqueous solution of 0.02 mole cupric acetate. The solution becomes darker in blue color immediately with the formation of the copper chelate. Inability of the solution to plate out copper on a clean and polished iron strip indicates that the copper is effectively removed from solution by the formation of a chelate.

*Example 1-O$_2$*

An aqueous solution of 0.1 mole of the chelating agent of Example 1-O$_2$ is added to an aqueous solution containing 0.025 mole ferrous sulfate. Lack of the usual formation of a red sediment in the water subsequently due to oxidation and precipitation of iron as hydrated oxide shows the iron had been chelated while in the ferrous form by the reagent $1-O_2$ and thus effectively removed from further reactions.

*Example 1–$A_5O_1$*

An aqueous solution of 0.1 mole of the chelating agent $1-A_5O_1$ is treated with an aqueous solution containing 0.01 mole nickelous acetate. The solution turns to a darker green indicating that a chelate type of material had been formed.

To avoid repetitive detail, chelates are formed from the above copper, iron and nickel salts and the compounds shown in the following table.

CHELATING AGENTS

Polyethyleneimine, molecular wt. 900
Polyethyleneimine, molecular wt. 5,000
Polyethyleneimine, molecular wt. 11,500
Polyethyleneimine, molecular wt. 20,000
Polyethyleneimine, molecular wt. 50,000
Polyethyleneimine, molecular wt. 100,000

| | |
|---|---|
| $1-A_7$ | $16-O_4H$ |
| $1-O_2$ | $4-K_1$ |
| $10-O_1$ | $5-K_1$ |
| $16-O_1$ | $5-K_3$ |
| $19-O_1$ | $6-K_2$ |
| $20-O_1$ | $20-O_1KX$ |
| $22-O_5$ | $1-K_2A$ |
| $1-A_5O_1$ | $1-O_2HKA$ |
| $24-O_4A$ | $6-U_1$ |
| $1-O_2H$ | |

CHELATING AGENTS

Polypropyleneimine, molecular weight 500
Polypropyleneimine, molecular weight 1,000
Polypropyleneimine, molecular weight 5,000
Polypropyleneimine, molecular weight 10,000
Polypropyleneimine, molecular weight 20,000
Polypropyleneimine, molecular weight 40,000

| | |
|---|---|
| $15-A_1$ | $17-H_3O_2H$ |
| $19-A_2$ | $9-K_3$ |
| $27-O_1$ | $12-K_2$ |
| $39-O_1$ | $61-O_2K$ |
| $44-O_2$ | $46-O_2HK$ |
| $47-O$ | $8-K_3A$ |
| $55-O_2$ | $7-K_2A$ |
| $15-A_2O_3$ | $61-O_2KA$ |
| $20-A_1O_2$ | $8-U_2$ |
| $28-O_3A$ | $11-U_3$ |
| $62-O_2A$ | $10-C_2$ |
| $27-O_3H$ | $15-A_2O_1HC$ |

ADDITIVE FOR LUBRICATING OILS

This phase of the invention relates to the use of the compounds of this invention to produce an improved lubricating oil adapted for use in internal combustion engines.

It is generally conceded that in the recent development of internal combustion engines, and particularly engines designed for heavy duty service, the increase in operating temperatures, together with the reduction of clearances and the use of hard bearing alloys, such as copper-lead, cadmium, silver, etc., has set up such severe operating conditions as to necessitate an improvement in the highly solvent refined mineral oils marketed for use as lubricants. These vigorous operating conditions, which are most prevalent in diesel and gasoline engines used in heavy duty bus and tractor service, where the piston ring temperatures range from approximately 425° to 650° F. and pressures from the oxidizing combustion gases are as high as 750 to 1150 pounds per square inch, have seriously accentuated such problems as corrosion, oxidization and resin formation in the solvent refined mineral lubricating oils with the resultant deleterious effect on the efficiency of the engines. The nature and extent of these problems depend upon the conditions of operation of the particular engine type, the type and extent of refining of the base oil used, and numerous other factors.

The tendency of mineral lubricating oils to deposit gums, resins, soot, and varnish-like materials about the valves, rings, pistons, cylinders and other engine parts can be largely overcome by the addition of certain types of additive ingredients which possess detergent qualities when dissolved or dispersed in lubricating oils. By detergent property is meant not only that property which prevents the accumulation or deposition of such materials as distinguished from solvent action upon those accumulations or deposits.

In addition thereto, the added tendency of these oils to corrode the metal surfaces with which the lubricating oil comes in contact may be overcome or reduced by the addition of additive components which possess antioxidant or anti-corrosive properties when dissolved or dispersed in mineral lubricating oils. These anti-oxidant or anti-corrosive properties are meant to include all such properties which effect a reduction or elimination of weight loss of the lubricated surfaces, particularly bearing surfaces, which results from the corrosive action of the mineral lubricating oil. Incorporation of these compositions in lubricating oils provides a mineral oil composition which possesses the above-mentioned detergent and anti-oxidant or anti-corrosive properties together with improved stability in service and storage and improved load-carrying capacity.

However, when a small proportion of a compound within the scope of the present invention is blended with a mineral lubricating oil, a mineral oil composition is formed possessing excellent detergent, anti-oxidant and/or anti-corrosive, stabilizing, and load-carrying (i.e., extreme pressure) properties.

These compositions can be added undiluted or after being diluted in a suitable solvent. For ease of handling a concentrate of the compounds of this invention in a hydrocarbon oil can be prepared, for example, in concentrations of 5%–50% or higher.

The proportions of active additive actually present in the mineral lubricating oil composition may vary between 0.1% to 5.0% by weight based on the composition, depending upon the particular base oil used and the type of engine and service involved. However, the range of proportions between 0.25% to 2.0% by weight has been found to be particularly effective in imparting excellent detergent, anti-corrosive, and load-carrying properties to the mineral lubricating oil.

The compositions of the present invention can be employed alone or together with an auxiliary additive to further enhance the anti-oxidant or anti-corrosive properties of the mineral oil with which the additives are used in certain diesel and gasoline engines designed for heavy duty service.

The multifunctional additives of the present invention may further be used in combination with other additive ingredients such as anti-corrosive sulfurized agents, pour point depressors, oiliness agents, extreme pressure agents, blooming agents, viscosity index improving agents, color stabilizers, etc.

The following examples are presented for purposes of illustration.

The compounds shown in the following table are added to a distilled, solvent-refined, dewaxed, paraffin base Mid-Continent lubricating oil, SAE 30 grade, in ratios of 0.5 to 1.0% and tested in a single cylinder standard Lauson engine for 24 hours at 1800 r.p.m. at a crankcase temperature of 275°–300° C., conditions which simulate extremely severe operating conditions. At the end of the 24 hour period the engine is dismantled and the condition of the piston noted. The oils containing the compositions shown in the following table are invariably superior to the controls which contain no additive in both the Lauson Detergency and the Lauson Varnish tests.

These same test oils are tested for anti-corrosive properties according to the following technique:

A copper-lead bearing specimen, encased in a special non-wear bushing and rotatably mounted on a stainless steel shaft, is immersed in a glass pot of the oil to be tested. The test oil is heated to a controlled temperature of either 250° F. or 350° F. and continuously circulated between the bearing specimen and the shaft for ten hours.

According to the above tests the oils containing the compositions shown in the following table are superior to the control oil without additive.

COMPOUNDS USED AS ADDITIVE FOR LUBRICATING OILS

| | |
|---|---|
| $2-A_3$ | $5-K_2C$ |
| $4-A_2$ | $15-A_1$ |
| $7-A_3$ | $17-A_3$ |
| $10-A_2$ | $18-A_3$ |
| $12-A_2$ | $20-A_3$ |
| $2-O_8$ | $29-O_3$ |
| $3-O_3$ | $33-O$ |
| $20-O_5$ | $34-O$ |
| $2-A_4O$ | $39-O_4$ |
| $9-A_2O$ | $46-O_3$ |
| $11-A_3O_2$ | $50-O_3$ |
| $16-O_5A$ | $15-A_2O_5$ |
| $26-O_1A$ | $19-A_3O_1$ |
| $17-O_1H$ | $29-O_2A$ |
| $5-K_1$ | $43-O_6A$ |
| $19-O_2K$ | $17-A_3O_2H$ |
| $4-K_4X$ | $11-K_3$ |
| $6-A_4KA$ | $36-O_4K$ |
| $1-U_3$ | $19-A_3O_3KA$ |
| $5-U_3$ | $11-U_1$ |
| $4-K_4AU$ | $11-C_2$ |
| $5-C_2$ | $51-O_4AC$ |

EMULSIFYING AGENTS

This phase of our invention relates to the use of the compositions of this invention as emulsifying agents in preparing suspensions and colloidal dispersions, all such disperse systems being referred to hereinafter as emulsions. They can be used to prepare such emulsions in which organic materials having little or no solubility in water are caused to be uniformly distributed therein in a fine state of subdivision.

As is well known to those familiar with the art, two liquids which are mutually insoluble may be emulsified by prolonged mechanical agitation. However, if the resulting emulsion contains much more than about one percent of the disperse phase, it is unstable and the component liquids soon separate into two layers. Thus a small portion of oil in a large volume of water may be emulsified by shaking. However, on standing, the minute droplets of oil soon coalesce and the liquids separate into two phases. In general, the larger the proportion of oil in the mixture, the more unstable the emulsion becomes.

Although stable emulsions of two pure immiscible liquids cannot ordinarily be prepared, they can readily be stabilized by the addition of a third substance, known as an emulsifying agent or an emulsifier, to one of the liquid phases. When the emulsifying agent is added to the oil phase, the resultant oil is known as an emulsifiable oil. With the aid of such materials, two main types of emulsions have heretofore been prepared; namely, emulsions in which oil is dispersed in water, generally referred to as the oil-in-water type, and emulsions in which water is dispersed in oil, known as the water-in-oil type. The emulsifying agent employed in each instance will be dependent upon the particular type of emulsion being produced. Materials which are excellent emulsifiers for the water-in-oil type emulsion are sometimes ineffective to stabilize an oil-in-water emulsion and, conversely, agents which are satisfactory for stabilizing oil-in-water type emulsions are quite often useless for imparting stability to a water-in-oil type emulsion. For example, it is known that the alkali metal soaps are excellent emulsifying agents for oil-in-water emulsions, whereas they are unsatisfactory for water-in-oil emulsions. On the other hand, although the soaps of the heavy metals are not good emulsifying agents for producing oil-in-water emulsions they are effective for stabilizing water-in-oil emulsions. Accordingly, it will be evident that in stabilizing emulsions of oil and water with an emulsifier, the particular type of emulsion being produced is a factor of considerable importance.

However, minor amounts of compounds of the present invention are useful in preparing both water-in-oil and oil-in-water type emulsions. In general, the O/W emulsifiers are more hydrophilic than olephilic as compared to the W/O emulsifiers.

The term "oil" is used herein in the broad sense usually accorded that term in the emulsion art, i.e., to designate any liquid which is insoluble in water. Accordingly, the oil phase of the emulsions can be composed of mineral lubricating oils, or various fractions thereof; vegetable oils, such as cotton-seed oil, castor oil, linseed oil, tung oil, soy bean oil, oitica oil, etc.; animal oils, such as sperm oil, oleo oil, etc.; fish oils, such as codliver oil, porpoise oil, salmon oil, etc.; petroleum waxes, such as slack wax and paraffin wax; natural waxes, such as carnauba wax, beeswax, Japan wax, etc.; and, in general, any of those materials in the art capable of making up the oil phase of an emulsion.

In general, the emulsions are prepared by combining oil, water, and the emulsifying agent and agitating the mixture until a suitable emulsion is obtained. The size of the particles present in the emulsion is to a great extent dependent on the degree of shearing employed during the preparation. By employing an apparatus having a high stirring speed, particles having the desired fine size can more readily be obtained. The strength of the emulsions can be varied over wide limits but good results have been obtained in emulsions containing from 0.5 to 100 parts by weight of the oil component per 0.5 to 100 parts by weight of water. The emulsifier component of the system is present in the amount of 0.01 to 5% by weight or higher, but preferably 0.1 to 1.5%, based on the total weight of the system.

Our reagents are useful in undiluted form or diluted with any suitable solvent. Water is used whenever possible, because of its ready availability and negligible cost; but in some cases, non-aqueous solvents such as aromatic petroleum solvent may be found preferable. The products themselves may exhibit solubilities ranging from rather modest water-dispersibility to full and complete dispersibility in that solvent. Because of the small proportions in which our reagents are customarily employed in practicing our process, apparent solubility in bulk has little significance. In the extremely low concentrations of use they undoubtedly exhibit appreciable water-solubility or water-dispersibility as well as oil-solubility or oil-dispersibility.

Our reagents may be employed alone, or they may in some instances be employed to advantage admixed with other and compatible emulsifiers.

As is well known to those skilled in the art a great many factors must be considered in the preparation of such emulsions, such as the temperature throughout the production cycle, extent and duration of agitation and/or time of incorporation of the various ingredients, order of addition of the ingredients, and the type of product desired. For example, emulsions serving as carriers for insecticides are readily and easily prepared using two parts of a compound of this invention and 200 parts of water to form a homogeneous, clear solution which if stirred vigorously with an equal volume of kerosene, naphtha or other low boiling hydrocarbon will produce a stable emulsion which can be diluted to any desired extent with water. The hydrocarbon can be used as a solvent for insecticidal compositions and is therefore useful in the preparation of insecticidal sprays.

It would, of course, be possible to present numerous other examples in which products can be prepared for specific purposes. Emulsions, pastes and cream useful as scouring and wetting agent, disinfectant, lubricants, leather conditioners, leather polishes, furniture and auto polishes, waterproofing agents, cutting oils, soluble greases, insecticides, etc., can readily be produced by application of the principles herein presented. The advantages to be derived are manifold. Suffice it to say that compounds of this type are not only efficient as emulsifiers, but also, due to their antioxidant character, prevent deterioration by atmospheric agents and thereby exert a distinct protective action where the products contain an easily oxidizable group or where the product is used as a textile or leather conditioning or treating agent. This same tendency is furthermore to be recognized as an advantage where emulsions are used in contact with metals and the antioxidant, surface active constituent actually serves as an inhibitor.

The following examples are presented for purposes of illustration.

Mineral oils containing the emulsifiers listed below are prepared by adding a minor proportion (0.5% by weight based on weight of oil) of the emulsifier to a light mineral oil. One liter of water is then added to 25 grams of emulsifier containing oil with agitation until a thick stable emulsion is formed. The emulsions are useful for lubricating moving parts under conditions where emulsions are desirable, such as in steam cylinder lubrication and the like. These emulsifier containing oils can also be used to produce emulsions useful for treating textiles, in waterproofing materials, in coating paper, and the like.

COMPOUNDS USED AS EMULSIFYING AGENTS

| | |
|---|---|
| 1–$A_4$ | 1–$O_2H$ |
| 3–$A_1$ | 15–$O_6H$ |
| 6–$A_4$ | 5–$K_1$ |
| 8–$A_3$ | 14–$O_6AK$ |
| 9–$A_3$ | 2–$K_4X$ |
| 12–$A_2$ | 3–$O_2KX$ |
| 1–$O_6$ | 5–$K_3A$ |
| 2–$O_6$ | 1–$O_2HKA$ |
| 3–$O_1$ | 5–$U_1$ |
| 6–$O_4$ | 19–$O_1U$ |
| 19–$O_5$ | 1–$C_3$ |
| 1–$A_5O_1$ | 5–$C_2$ |
| 4–$A_2O$ | 8–$A_3C$ |
| 10–$A_1O_2$ | 1–$A_5O_6C$ |
| 1–$O_1A_1$ | 1–$K_2AC$ |
| 16–$O_5A$ | |

Polyethyleneimine, molecular weight 900
Polyethyleneimine, molecular weight 5,000
Polyethyleneimine, molecular weight 11,500
Polyethyleneimine, molecular weight 20,000
Polyethyleneimine, molecular weight 50,000
Polyethyleneimine, molecular weight 100,000

COMPOUNDS USED AS EMULSIFYING AGENTS

Polypropyleneimine, molecular weight 500
Polypropyleneimine, molecular weight 1,000
Polypropyleneimine, molecular weight 5,000
Polypropyleneimine, molecular weight 10,000
Polypropyleneimine, molecular weight 20,000
Polypropyleneimine, molecular weight 40,000

| | |
|---|---|
| 15–$A_3$ | 20–$A_1O_2$ |
| 18–$A_1$ | 28–$O_3A$ |
| 19–$A_3$ | 36–$O_3H$ |
| 27–$O_3$ | 15–$A_2O_1H$ |
| 28–$O_4$ | 7–$K_4$ |
| 29–$O_2$ | 9–$K_4$ |
| 31–$O_1$ | 11–$K_4$ |
| 32–$O_2$ | 44–$O_5AK$ |
| 45–$O_2$ | 7–$K_2A$ |
| 48–$O_3$ | 20–$A_1O_2HKA$ |
| 57–$O_2$ | 11–$U_1$ |
| 61–$O_4$ | 8–$C_3$ |
| 18–$A_3O_3$ | 12–$K_2C$ |

CUTTING OIL

This phase of the invention relates to the use of the compositions of this invention in cutting oils and in particular in emulsifiable cutting oils.

In the fabrication of metals into stock materials, articles, machine elements, etc., by methods involving cutting, grooving, turning, milling, broaching, boring, hobbing, gear cutting, grinding, stamping, drawing, etc., operations, frictional forces are created which cause overheating and accelerated dulling of the cutting tools, dies, etc., used in such operations. Moreover, the metals being subjected to the aforementioned operations become overheated, thereby deleteriously affecting the uniformity and quality of the finished products.

In an attempt to combat these difficulties, it is conventional to employ various oils and compositions containing oils for cooling and lubricating both the cutting tools, dies, etc., as well as the metal being worked upon. In general, there are four main types of cutting oils, to wit, (1) straight mineral oil, (2) mineral lard oil, (3) sulfurized mineral or mineral lard oil and (4) soluble oils (emulsifiable with water). This phase of the present invention is primarily directed to the so-called soluble cutting oils which readily emulsify with cold or warm water.

The two primary functions of a cutting oil in the metal working arts are cooling and lubricating which in turn serve to increase production and yield products having a better surface finish. An ideal cutting oil should be endowed with the following characteristics: (1) high specific heat, (2) good wetting and spreading power, (3) adherence to the essential elements in a good film strength, (4) a viscosity permitting adequate flow, (5) stability, (6) free of fire hazards, (7) non-corrosive and (8) non-injurious to health.

The compositions of this invention can be used in preparing cutting oils having these qualities to a high degree.

In the preparation of the cutting oils of the invention, any suitable oil, for example, a mineral oil may be employed, depending on the particular use to which the product is to be applied. The lighter mineral oils, such as white oil or paraffin oil, have been found to function very successfully and their use for the purposes of this invention is preferred. Oils of this type render the degree of lubrication desired especially in combination or cooperation with the remaining components of the novel composition.

The soluble cutting oil base of the invention may be emulsified with water in any desired proportion depending upon the machining operation to be carried out. Moreover, the proportion of the soluble oil with respect to the water, controls the type of emulsion produced. It has been found that both the oil-in-water and water-in-oil type emulsions are obtained depending upon the specific compound employed and the amount of soluble oil used. When the amount of oil used is less than the transition point, the oil-in-water type emulsion is produced; whereas if the quantity of soluble oil is increased beyond the transition point, inversion takes place resulting in the water-in-oil type emulsion.

As hereinbefore mentioned, the type of emulsion selected will depend upon the nature of the machining operations to be carried out. In any event, both types of emulsions possess the aforementioned characteristics which advance the product of the invention closer to the so-called ideal cutting oil. In view of its non-corrosive character, the cutting oil of the invention may be used in fabricating non-ferrous metals as well as the ferrous metals and alloys.

The expressions "soluble oil" and "soluble cutting oil base" are used herein to connote a composition which is emulsifiable with an aqueous medium to form an emulsified cutting oil of either a water-in-oil or oil-in-water type. In practice these cutting oils take up water to form 8:1 to 100:1 water-to-oil emulsions customarily formed for the cooling and lubrication of metal working operations.

The ratios of the compositions of this invention in the soluble cutting oil base can vary within wide limits. In general, we employ 0.1 to 1.5% or higher but preferably 0.3% to 0.8%, by weight, based on the weight of cutting oil, of these compounds in the cutting oil.

In addition, it will be understood that any conventional modifiers may be added to the product of this invention, such as soaps, antioxidants, anti-foamants, load-bearing agents (extreme pressure or oiliness additives) and the like.

Furthermore, the compositions of this invention can be employed in other types of cutting oils, for example, straight mineral oil, mineral lard oil, and sulfurized mineral or mineral lard oil.

The following examples are presented to illustrate the present invention.

A cutting oil is prepared by dissolving 0.5% by weight of the compounds shown in the following table in a mineral oil of 130 SSU viscosity at 100° F. and 35 viscosity index. These compositions when emulsified with both 1:10 parts of water and 1:20 parts of water produce excellent cutting oils.

COMPOUNDS USED AS CUTTING OILS

| | |
|---|---|
| 10–$A_1$ | 15–$A_1$ |
| 1–$O_4$ | 18–$A_3$ |
| 4–$O_2$ | 29–$O_3$ |
| 9–O | 32–$O_1$ |
| 12–$O_4$ | 33–O |
| 10–$A_1O_3$ | 34–O |
| 15–$O_3A$ | 46–$O_2$ |
| 15–$O_6H$ | 60–$O_3$ |
| 5–$K_3$ | 15–$A_2O_5$ |
| 4–$O_1K$ | 18–$A_3O_2$ |
| 3–$K_4X$ | 29–$O_2A$ |
| 14–$O_1KX$ | 20–$A_1O_1H$ |
| 20–$O_1HKX$ | 10–$K_2$ |
| 5–$K_2A$ | 27–$O_4K$ |
| 1–$O_2KA$ | 20–$A_1KA$ |
| 5–$U_1$ | 11–$U_2$ |
| 5–$C_3$ | 10–$C_1$ |
| 3–$O_1C$ | 15–$A_2OHC$ |

Having thus described our invention, what we claim as new and desire to obtain by Letters Patent is:

1. A lubricating oil composition comprising a major proportion of a mineral lubricating oil and about 0.1 to 5% by weight based on the total composition, of an amide of a linear polymer of ethyleneimine having a molecular weight ranging from 30,000 to 40,000 and an unsubstituted saturated aliphatic monocarboxylic acid containing from 10 to 20 carbon atoms, said polymer of ethyleneimine being completely amidified with said acid.

2. A lubricating oil composition comprising a major proportion of a lubricating oil and about 0.1 to 5% by weight based on the total composition, of a compound selected from the group consisting of
   (1) a linear polymer of a 1,2-alkyleneimine, said polymer having a molecular weight of at least 800, each alkylene unit having 2 to 20 carbon atoms,
   (2) an acylated linear polymer of a 1,2-alkyleneimine, said polymer having a molecular weight of at least 800, each alkylene unit having 2 to 20 carbon atoms, formed by reacting, at a temperature of from about 120° C. to about 300° C., said linear polymer with an acylating agent, said acylating agent having 7–39 carbon atoms and being selected from the group consisting of aliphatic carboxylic acids, aromatic polycarboxylic acids, and precursors thereof each capable of forming said acid in said reaction,
   (3) an oil-soluble oxyalkylated linear polymer of a 1,2-alkyleneimine, said polymer having a molecular weight of at least 800, each alkylene unit having 2 to 20 carbon atoms, formed by reacting, at a temperature of from about 80° C. to about 200° C. and a pressure of from about 10 p.s.i. to about 200 p.s.i., said polymer with an alkylene oxide having 2–8 carbon atoms,
   (4) an alkylated linear polymer of a 1,2-alkyleneimine, said polymer having a molecular weight of at least 800, each alkylene unit having 2 to 20 carbon atoms, formed by reacting, at a temperature of from about 100° C. to about 250° C., said polymer with a hydrocarbon halide alkylating agent having 1–30 carbon atoms,
   (5) an olefinated linear polymer of a 1,2-alkyleneimine, said polymer having a molecular weight of at least 800, each alkylene unit having 2 to 20 carbon atoms, formed by reacting, at a temperature of from about 70° C. to about 100° C., said polymer with an olefinating agent selected from the group consisting of acrylonitrile, styrene, butadiene, vinyl ethers, and vinyl sulfones,
   (6) a Schiff base reaction product of a linear polymer of a 1,2-alkyleneimine, said polymer having a molecular weight of at least 800, each alkylene unit having 2 to 20 carbon atoms, formed by reacting said polymer with a compound selected from the group consisting of aldehydes and ketones,
   (7) an acylated, then oxyalkylated linear polymer of a 1,2-alkyleneimine, said polymer having a molecular weight of at least 800, each alkylene unit therein having 2–20 carbon atoms, formed by reacting, at a temperature of from about 125° C. to about 300° C., said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 80° C. to about 200° C. and a pressure of from about 10 p.s.i. to about 200 p.s.i., with an alkylene oxide having 2–8 carbon atoms,
   (8) an oxyalkylated, then acylated linear polymer of a 1,2-alkyleneimine, said polymer having a molecular weight of at least 800, said alkylene unit therein having 2–20 carbon atoms, formed by reacting, at a temperature of from about 80° C. to about 200° C. and a pressure of from about 10 p.s.i. to about 200 p.s.i., said polymer with an alkylene oxide having 2–8 carbon atoms and then reacting said oxyalkylated polymer, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction,
   (9) an alkylated, then acylated linear polymer of a 1,2-alkyleneimine, said polymer having a molecular weight of at least 800, each alkylene unit therein having 2–20 carbon atoms, formed by reacting, at a temperature of from about 100° C. to about 250° C., said polymer with a hydrocarbon halide alkylating agent having 1–30 carbon atoms, and then reacting said alkylated polymer, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction,

(10) an acylated, then alkylated linear polymer of a 1,2-alkyleneimine, said polymer having a molecular weight of at least 800, each alkylene unit therein having 2–20 carbon atoms, formed by reacting, at a temperature of from about 120° C. to about 300° C., said polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 100° C. to about 250° C., with a hydrocarbon halide alkylating agent having 1–30 carbon atoms,

(11) an oxyalkylated, then alkylated linear polymer of a 1,2-alkyleneimine, said polymer having a molecular weight of at least 800, each alkylene unit therein having 2–20 carbon atoms, formed by reacting, at a temperature of from about 80° C. to about 220° C. and a pressure of from about 10 p.s.i. to about 200 p.s.i., said polymer with an alkylene oxide having 2–8 carbon atoms, and then reacting said oxyalkylated polymer, at a temperature of from about 100° C. to about 250° C., with a hydrocarbon halide alkylating agent having 1–30 carbon atoms,

(12) a Schiff base reaction product of an acylated linear polymer of a 1,2-alkyleneimine, said polymer having a molecular weight of at least 800, each alkylene unit therein having 2–20 carbon atoms, formed by reacting, at a temperature of from about 120° C. to about 300° C., said polymer with an acylating agent selected from the group consisting of (i) a carboxylic acid having 7–39 carbon atoms and (ii) a precursor of said carboxylic acid capable of forming said acid in said reaction, and then reacting said acylated polymer with a compound selected from the group consisting of aldehydes and ketones,

(13) a Schiff base reaction product of an alkylated linear polymer of a 1,2-alkyleneimine, said polymer having a molecular weight of at least 800, each alkylene unit therein having 2–20 carbon atoms, formed by reacting, at a temperature of from about 100° C. to about 250° C., said polymer with a hydrocarbon halide alkylating agent having 1–30 carbon atoms, and then reacting said alkylated polymer with a compound selected from the group consisting of aldehydes and ketones,

(14) an oxyalkylated Schiff base reaction product of a linear polymer of a 1,2-alkyleneimine, said linear polymer having a molecular weight of at least 800, each alkylene unit therein having 2–20 carbon atoms formed by reacting said linear polymer with a compound selected from the group consisting of aldehydes and ketones to form said Schiff base reaction product and then reacting said Schiff base reaction product, at a temperature of from about 80° C. to about 200° C. and a pressure of from about 10 p.s.i. to about 200 p.s.i., with an alkylene oxide having 2–8 carbon atoms,

(15) an acylated, then olefinated linear polymer of a 1,2-alkyleneimine, said polymer having a molecular weight of at least 800, each alkylene unit therein having 2–20 carbon atoms, formed by reacting, at a temperature of from about 120° C. to about 300° C., said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 70° C. to about 100° C., with an olefinating agent selected from the group consisting of acrylonitrile, styrene, butadiene, vinyl ethers and vinyl sulfones, and

(16) an alkylated, then olefinated linear polymer of a 1,2-alkyleneimine, said polymer having a molecular weight of at least 800, each alkylene unit therein having 2–20 carbon atoms, formed by reacting, at a temperature of from about 100° C. to about 250° C., said polymer with a hydrocarbon halide alkylating agent having from 1–30 carbon atoms, and then reacting said alkylated polymer, at a temperature of from about 70° C. to about 100° C., with an olefinating agent selected from the group consisting of acrylonitrile, styrene, butadiene, vinyl ethers and vinyl sulfones.

3. The lubricating oil composition of claim 2 wherein the compound is a linear polymer of a 1,2-alkyleneimine, said polymer having a molecular weight of at least 800, each alkylene unit having 2 to 20 carbon atoms.

4. The lubricating oil composition of claim 2 wherein the compound is an acylated linear polymer of a 1,2-alkyleneimine, said polymer having a molecular weight of at least 800, each alkylene unit having 2 to 20 carbon atoms, formed by reacting, at a temperature of from about 120° C. to about 300° C., said linear polymer with an acylating agent, said acylating agent having 7–39 carbon atoms and being selected from the group consisting of aliphatic carboxylic acids, aromatic polycarboxylic acids, and precursors thereof each capable of forming said acid in said reaction.

5. The lubricating oil composition of claim 2 wherein the compound is an oil-soluble oxyalkylated linear polymer of a 1,2-alkyleneimine, said polymer having a molecular weight of at least 800, each alkylene unit having 2 to 20 carbon atoms, formed by reacting, at a temperature of from about 80° C. to about 200° C. and a pressure of from about 10 p.s.i. to about 200 p.s.i., said polymer with an alkylene oxide having 2–8 carbon atoms.

6. The lubricating oil composition of claim 2 wherein the compound is an alkylated linear polymer of a 1,2-alkyleneimine, said polymer having a molecular weight of at least 800, each alkylene unit having 2 to 20 carbon atoms, formed by reacting, at a temperature of from about 100° C. to about 250° C., said polymer with a hydrocarbon halide alkylating agent having 1–30 carbon atoms.

7. The lubricating oil composition of claim 2 wherein the compound is an olefinated linear polymer of a 1,2-alkyleneimine, said polymer having a molecular weight of at least 800, each alkylene unit having 2 to 20 carbon atoms, formed by reacting, at a temperature of from about 70° C. to about 100° C., said polymer with an olefinating agent selected from the group consisting of acrylonitrile, styrene, butadiene, vinyl ethers, and vinyl sulfones.

8. The lubricating oil composition of claim 2 wherein the compound is a Schiff base reaction product of a linear polymer of a 1,2-alkyleneimine, said polymer having a molecular weight of at least 800, each alkylene unit having 2 to 20 carbon atoms, formed by reacting said polymer with a compound selected from the group consisting of aldehydes and ketones.

9. The lubricating oil composition of claim 2 wherein the compound is an acylated, then oxyalkylated linear polymer of a 1,2-alkyleneimine, said polymer having a molecular weight of at least 800, each alkylene unit having 2–20 carbon atoms, formed by reacting, at a temperature of from about 125° C. to about 300° C., said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 80° C. to about 200° C. and a pressure of from about 10 p.s.i. to about 200 p.s.i., with an alkylene oxide having 2–8 carbon atoms.

10. A lubricating oil composition comprising a major proportion of a lubricating oil and about 0.1 to 5% by weight based on the total composition, of a compound selected from the group consisting of (1) a linear polymer of ethyleneimine having a molecular weight ranging from 30,000 to 40,000,
(2) an amide of a linear polymer of ethyleneimine having a molecular weight ranging from 30,000 to 40,000 and an unsubstituted saturated aliphatic monocarboxylic acid containing from 10 to 20 carbon atoms, said polymer of ethyleneimine being completely amidified with said acid,
(3) an oil-soluble oxyalkylated linear polymer of ethyleneimine having a molecular weight ranging from 30,000 to 40,000, formed by reacting, at a temperature of from about 80° C. to about 200° C. and a pressure of from about 10 p.s.i. to about 200 p.s.i., said polymer with an alkylene oxide having 2–8 carbon atoms,
(4) an alkylated linear polymer having a molecular weight ranging from 30,000 to 40,000, formed by reacting, at a temperature of from about 100° C. to about 250° C., said polymer with a hydrocarbon halide alkylated agent having 1–30 carbon atoms,
(5) an olefinated linear polymer of ethyleneimine having a molecular weight ranging from 30,000 to 40,000, formed by reacting, at a temperature of from about 70° C. to about 100° C., said polymer with an olefinating agent selected from the group consisting of acrylonitrile, styrene, butadiene, vinyl ethers, and vinyl sulfones,
(6) a Schiff base reaction product of a linear polymer of ethyleneimine having a molecular weight ranging from 30,000 to 40,000, formed by reacting said polymer with a compound selected from the group consisting of aldehydes and ketones,
(7) an acylated, then oxyalkylated linear polymer of ethyleneimine having a molecular weight ranging from 30,000 to 40,000 formed by reacting, at a temperature of from about 125° C. to about 300° C., said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 80° C. to about 200° C. and a pressure of from about 10 p.s.i. to about 200 p.s.i. with an alkylene oxide having 2–8 carbon atoms,
(8) an oxyalkylated, then acylated linear polymer of ethyleneimine having a molecular weight ranging from 30,000 to 40,000 formed by reacting, at a temperature of from about 80° C. to about 200° C. and a pressure of from about 10 p.s.i. to about 200 p.s.i., said polymer with an alkylene oxide having 2–8 carbon atoms and then reacting said oxyalkylated polymer, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction,
(9) an alkylated, then acylated linear polymer of ethyleneimine having a molecular weight ranging from 30,000 to 40,000 formed by reacting, at a temperature of from about 100° C. to about 250° C., said polymer with a hydrocarbon halide alkylating agent having 1–30 carbon atoms, and then reacting said alkylated polymer, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction,
(10) an acylated, then alkylated linear polymer of ethyleneimine having a molecular weight ranging from 30,000 to 40,000 formed by reacting, at a temperature of from about 120° C. to about 300° C., said polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 100° C. to about 250° C., with a hydrocarbon halide alkylating agent having 1–30 carbon atoms,
(11) an oxyalkylated, then alkylated linear polymer of ethyleneimine having a molecular weight ranging from 30,000 to 40,000 formed by reacting, at a temperature of from about 80° C. to about 200° C. and a pressure of from about 10 p.s.i. to about 200 p.s.i., said polymer with an alkylene oxide having 2–8 carbon atoms, and then reacting said oxyalkylated polymer, at a temperature of from about 100° C. to about 250° C., with a hydrocarbon halide alkylating agent having 1–30 carbon atoms,
(12) a Schiff base reaction product of an acylated linear polymer of ethyleneimine having a molecular weight ranging from 30,000 to 40,000 formed by reacting, at a temperature of from about 120° C. to about 300° C., said polymer with an acylating agent selected from the group consisting of (i) a carboxylic acid having 7–39 carbon atoms and (ii) a precursor of said carboxylic acid capable of forming said acid in said reaction, and then reacting said acylated polymer with a compound selected from the group consisting of aldehydes and ketones,
(13) a Schiff base reaction product of an alkylated linear polymer of ethyleneimine having a molecular weight ranging from 30,000 to 40,000 formed by reacting, at a temperature of from about 100° C. to about 250° C., said polymer with a hydrocarbon halide alkylating agent having 1–30 carbon atoms, and then reacting said alkylated polymer with a compound selected from the group consisting of aldehydes and ketones,
(14) an oxyalkylated Schiff base reaction product of a linear polymer of ethyleneimine having a molecular weight ranging from 30,000 to 40,000 formed by reacting said linear polymer with a compound selected from the group consisting of aldehydes and ketones to form said Schiff base reaction product and then reacting said Schiff base reaction product, at a temperature of from about 80° C. to about 200° C. and a pressure of from about 10 p.s.i. to about 200 p.s.i., with an alkylene oxide having 2–8 carbon atoms,
(15) an acylated, then olefinated linear polymer of ethyleneimine having a molecular weight ranging from 30,000 to 40,000 formed by reacting, at a temperature of from about 120° C. to about 300° C., said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 70° C. to about 100° C., with an olefinating agent selected from the group consisting of acrylonitrile, styrene, butadiene, vinyl ethers and vinyl sulfones, and
(16) an alkylated, then olefinated linear polymer of ethyleneimine having a molecular weight ranging from 30,000 to 40,000 formed by reacting at a temperature of from about 100° C. to about 250° C., said polymer with a hydrocarbon halide alkylating agent having from 1–30 carbon atoms, and then reacting said alkylated polymer, at a temperature of from about 70° C. to about 100° C., with an olefinating agent selected from the group consisting of acrylonitrile, styrene, butadiene, vinyl ethers and vinyl sulfones.

11. The lubricating composition of claim 10 wherein the compound is a linear polymer of ethyleneimine having a molecular weight ranging from 30,000 to 40,000.

12. The lubricating composition of claim 10 wherein the compound is an oil-soluble oxyalkylated linear polymer of ethyleneimine having a molecular weight ranging from 30,000 to 40,000, formed by reacting, at a temperature of from about 80° C. to about 200° C. and a pressure of from about 10 p.s.i. to about 200 p.s.i., said polymer with an alkylene oxide having 2–8 carbon atoms.

13. The lubricating composition of claim 10 wherein the compound is an alkylated linear polymer having a molecular weight ranging from 30,000 to 40,000, formed by reacting, at a temperature of from about 100° C. to about 250° C., said polymer with a hydrocarbon halide alkylating agent having 1–30 carbon atoms.

14. The lubricating composition of claim 10 wherein the compound is an olefinated linear polymer of ethyleneimine having a molecular weight ranging from 30,000 to 40,000, formed by reacting, at a temperature of from about 70° C. to about 100° C., said polymer with an olefinating agent selected from the group consisting of acrylonitrile, styrene, butadiene, vinyl ethers, and vinyl sulfones.

15. The lubricating composition of claim 10 wherein the compound is a Schiff base reaction product of a linear polymer of ethyleneimine having a molecular weight ranging from 30,000 to 40,000, formed by reacting said polymer with a compound selected from the group consisting of aldehydes and ketones.

16. The lubricating composition of claim 10 wherein the compound is an acylated, then oxyalkylated linear polymer of ethyleneimine having a molecular weight ranging from 30,000 to 40,000, formed by reacting, at a temperature of from about 125° C. to about 300° C., said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 80° C. to about 200° C. and a pressure of from about 10 p.s.i. to about 200 p.s.i., with an alkylene oxide having 2–8 carbon atoms.

17. An emulsion comprising water, oil and about 0.01 to 5% by weight based on the total emulsion, of a compound selected from the group consisting of (1) a linear polymer of a 1,2-alkyleneimine, said polymer having a molecular weight of at least 800, each alkylene unit having 2 to 20 carbon atoms, (2) an acylated linear polymer of a 1,2-alkyleneimine, said polymer having a molecular weight of at least 800, each alkylene unit having 2 to 20 carbon atoms, formed by reacting, at a temperature of from about 120° C. to about 300° C., said linear polymer with an acylating agent selected from the group consisting of (i) a carboxylic acid having 7–39 carbon atoms and (ii) a precursor of said carboxylic acid capable of forming said acid in said reaction, (3) an oxyalkylated linear polymer of a 1,2-alkyleneimine, said polymer having a molecular weight of at least 800, each alkylene unit having 2 to 20 carbon atoms, formed by reacting, at a temperature of from about 80° C. to about 200° C. and a pressure of from about 10 p.s.i. to about 200 p.s.i., said polymer with an alkylene oxide having 2–8 carbon atoms, (4) an alkylated linear polymer of a 1,2-alkleneimine, said polymer having a molecular weight of at least 800, each alkylene unit having 2 to 20 carbon atoms, formed by reacting, at a temperature of from about 100° C. to about 250° C., said polymer with a hydrocarbon halide alkylating agent having 1–30 carbon atoms, (5) an olefinated linear polymer of a 1,2-alkyleneimine, said polymer having a molecular weight of at least 800, each alkylene unit having 2 to 20 carbon atoms, formed by reacting, at a temperature of from about 70° C. to about 100° C., said polymer with an olefinating agent selected from the group consisting of acrylonitrile, styrene, butadiene, vinyl ethers, and vinyl sulfones, (6) a Schiff base reaction product of a linear polymer of a 1,2-alkyleneimine, said polymer having a molecular weight of at least 800, each alklene unit having 2 to 20 carbon atoms, formed by reacting said polymer with a compound selected from the group consisting of aldehydes and ketones, (7) an acylated, then oxylkylated linear polymer of a 1,2-alkyleneimine, said polymer having a molecular weight of at least 800, each alkylene unit therein having 2–20 carbon atoms, formed by reacting, at a temperature of from about 125° C. to about 300° C., said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 80° C. to about 200° C. and a pressure of from about 10 p.s.i. to about 200 p.s.i., with an alkylene oxide having 2–8 carbon atoms, (8) an oxyalkylated, then acylated linear polymer of a 1,2-alkyleneimine, said polymer having a molecular weight of at least 800, said alkylene unit therein having 2–20 carbon atoms, formed by reacting, at a temperature of from about 80° C. to about 200° C. and a pressure of from about 10 p.s.i. to about 200 p.s.i., said polymer with an alkylene oxide having 2–8 carbon atoms and then reacting said oxyalkylated polymer, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction, (9) an alkylated, then acylated linear polymer of a 1,2-alkyleneimine, said polymer having a molecular weight of at least 800, each alkylene unit therein having 2–20 carbon atoms, formed by reacting, at a temperature of from about 100° C. to about 250° C., said polymer with a hydrocarbon halide alkylating agent having 1–30 carbon atoms, and then reacting said alkylated polymer, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction,

(10) an acylated, then alkylated linear polymer of a 1,2-alkyleneimine, said polymer having a molecular weight of at least 800, each alkylene unit therein having 2–20 carbon atoms, formed by reacting, at a temperature of from about 120° C. to about 300° C., said polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 100° C. to about 250° C., with a hydrocarbon halide alkylating agent having 1–30 carbon atoms,

(11) an oxylalkylated, then alkylated linear polymer of a 1,2-alkyleneimine, said polymer having a molecular weight of at least 800, each alkylene unit therein having 2–20 carbon atoms, formed by reacting, at a temperature of from about 80° C. to about 200° C. and a pressure of from about 10 p.s.i. to about 200 p.s.i., said polymer with an alkylene oxide having 2–8 carbon atoms, and then reacting said oxyalkylated polymer, at a temperature of from about 100° C. to about 250° C., with a hydrocarbon halide alkylating agent having 1–30 carbon atoms,

(12) a Schiff base reaction product of an acylated linear polymer of a 1,2-alkyleneimine, said polymer having a molecular weight of at least 800, each alkylene unit therein having 2–20 carbon atoms, formed by reacting, at a temperature of from about 120° C. to about 300° C., said polymer with an acylating agent selected from the group consisting of (i) a carboxylic acid having 7–39 carbon atoms and (ii) a precursor of said carboxylic acid capable of forming said acid in said reaction, and then reacting said acylated polymer with a compound selected from the group consisting of aldehydes and ketones,

(13) a Schiff base reaction product of an alkylated linear polymer of a 1,2-alkyleneimine, said polymer having a molecular weight of at least 800, each alkylene unit therein having 2–20 carbon atoms, formed by reacting, at a temperature of from about 100° C. to about 250° C., said polymer with a hydrocarbon halide alkylating agent having 1–30 carbon atoms, and then reacting said alkylated polymer with a compound selected from the group consisting of aldehydes and ketones,

(14) an oxyalkylated Schiff base reaction product of a linear polymer of a 1,2-alkyleneimine, said linear polymer having a molecular weight of at least 800, each alkylene unit therein having 2–20 carbon atoms formed by reacting said linear polymer with a compound selected from the group consisting of aldehydes and ketones to form said Schiff base reaction product and then reacting said Schiff base reaction product, at a temperature of from about 80° C. to about 200° C. and a pressure of from about 10 p.s.i. to about 200 p.s.i., with an alkylene oxide having 2–8 carbon atoms,

(15) an acylated, then olefinated linear polymer of a 1,2-alkyleneimine, said polymer having a molecular weight of at least 800, each alkylene unit therein having 2–20 carbon atoms, formed by reacting, at a temperature of from about 120° C. to about 300° C., said linear polymer with an acylating agent seselected from the group consisting of (i) a carboxylic acid having 7–39 carbon atoms and (ii) a precursor of said carboxylic acid capable of forming said acid in said reaction, and then reacting said acylated polymer, at a temperature of from about 70° C. to about 100° C., with an olefinating agent selected from the group consisting of acrylonitrile, styrene, butadiene, vinyl ethers and vinyl sulfones, and

(16) an alkylated, then olefinated linear polymer of a 1,2-alkyleneimine, said polymer having a molecular weight of at least 800, each alkylene unit therein having 2–20 carbon atoms, formed by reacting, at a temperature of from about 100° C. to about 250° C., said polymer with a hydrocarbon halide alkylating agent having from 1–30 carbon atoms, and then reacting said alkylated polymer, a temperature of from about 70° C. to about 100° C., with an olefinating agent selected from the group consisting of acrylonitrile, styrene, butadiene, vinyl ethers and vinyl sulfones.

18. The emulsion of claim 17 wherein the compound is a linear polymer of a 1,2-alkyleneimine, said polymer having a molecular weight of least 800, each alkylene unit having 2 to 20 carbon atoms.

19. The emulsion of claim 17 wherein the compound is an acylated linear polymer of a 1,2-alkyleneimine, said polymer having a molecular weight of at least 800, each alkylene unit having 2 to 20 carbon atoms, formed by reacting, at a temperature of from about 120° C. to about 300° C., said linear polymer with an acylating agent selected from the group consisting of (i) a carboxylic acid having 7–39 carbon atoms and (ii) a precursor of said carboxylic acid capable of forming said acid in said reaction.

20. The emulsion of claim 17 wherein the compound is an oxyalkylated linear polymer of a 1,2-alkyleneimine, said polymer having a molecular weight of at least 800, each alkylene unit having 2 to 20 carbon atoms, formed by reacting, at a temperature of from about 80° C. to about 200° C. and a pressure of from about 10 p.s.i. to about 200 p.s.i., said polymer with an alkylene oxide having 2–8 carbon atoms.

21. The emulsion of claim 17 wherein the compound is an alkylated linear polymer of a 1,2-alkyleneimine, said polymer having a molecular weight of at least 800, each alkylene unit having 2 to 20 carbon atoms, formed by reacting, at a temperature of from about 100° C. to about 250° C., said polymer with a hydrocarbon halide alkylating agent having 1–30 carbon atoms.

22. The emulsion of claim 17 wherein the compound is an olefinated linear polymer of a 1,2-alkyleneimine, said polymer having a molecular weight of at least 800, each alkylene unit having 2 to 20 carbon atoms, formed by reacting, at a temperature of from about 70° C. to about 100° C., said polymer with an olefinating agent selected from the group consisting of acrylonitrile, styrene, butadiene, vinyl ethers, and vinyl sulfones.

23. The emulsion of claim 17 wherein the compound is a Schiff base reaction product of a linear polymer of a 1,2-alkyleneimine, said polymer having a molecular weight of at least 800, each alkylene unit having 2 to 20 carbon atoms, formed by reacting said polymer with a compound selected from the group consisting of aldehydes and ketones.

24. The emulsion of claim 17 wherein the compound is an acylated, then oxyalkylated linear polymer of a 1,2-alkyleneimine, said polymer having a molecular weight of at least 800, each alkylene unit having 2–20 carbon atoms, formed by reacting, at a temperature of from about 125° C. to about 300° C., said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 80° C. to about 200° C. and a pressure of from about 10 p.s.i. to about 200 p.s.i., with an alkylene oxide having 2–8 carbon atoms.

25. A cutting oil composition comprising a cutting oil and about 0.1 to 1.5% by weight based on the weight of the cutting oil, of a compound selected from the group consisting of (1) a linear polymer of a 1,2-alkyleneimine, said polymer having a molecular weight of at least 800, each alkylene unit having 2 to 20 carbon atoms, (2) an acylated linear polymer of a 1,2-alkyleneimine, said polymer having a molecular weight of at least 800, each alkylene unit having 2 to 20 carbon atoms, formed by reacting, at a temperature of from about 120° C. to about 300° C., said linear polymer with an acylating agent, said acylating agent having 7–39 carbon atoms and being selected from the group consisting of aliphatic carboxylic acids, aromatic polycarboxylic acids, and precursors thereof each capable of forming said acid in said reaction, (3) an oil-soluble oxyalkylated linear polymer of a 1,2-alkyleneimine, said polymer having a molecular weight of at least 800, each alkylene unit having 2 to 20 carbon atoms, formed by reacting, at a temperature of from about 80° C. to about 200° C. and a pressure of from about 10 p.s.i. to about 200 p.s.i., said polymer with an alkylene oxide having 2–8 carbon atoms, (4) an alkylated linear polymer of a 1,2-alkyleneimine, said polymer having a molecular weight of at least 800, each alkylene unit having 2 to 20 carbon atoms, formed by reacting, at a temperature of from about 100° C. to about 250° C., said polymer with a hydrocarbon halide alkylating agent having 1–30 carbon atoms,
(5) an olefinated linear polymer of a 1,2-alkyleneimine, said polymer having a molecular weight of at least 800, each alkylene unit having 2 to 20 carbon atoms, formed by reacting, at a temperature of from about 70° C. to about 100° C., said polymer with an olefinating agent selected from the group consisting of acrylonitrile, styrene, butadiene, vinyl ethers, and vinyl sulfones,
(6) a Schiff base reaction product of a linear polymer of a 1,2-alkyleneimine, said polymer having a molecular weight of at least 800, each alkylene unit having 2 to 20 carbon atoms, formed by reacting said polymer with a compound selected from the group consisting of aldehydes and ketones,
(7) an acylated, then oxyalkylated linear polymer of a 1,2-alkyleneimine, said polymer having a molecular weight of at least 800, each alkylene unit therein having 2–20 carbon atoms, formed by reacting, at a temperature of from about 125° C. to about 300° C., said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 80° C. to about 200° C. and a pressure of from about 10 p.s.i. to about 200 p.s.i., with an alkylene oxide having 2–8 carbon atoms,
(8) an oxyalkylated, then acylated linear polymer of a 1,2-alkyleneimine, said polymer having a molecular weight of at least 800, said alkylene unit therein having 2–20 carbon atoms, formed by reacting, at a temperature of from about 80° C. to about 200° C. and a pressure of from about 10 p.s.i. to about 200 p.s.i., said polymer with an alkylene oxide having 2–8 carbon atoms and then reacting said oxyalkylated polymer, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction,
(9) an alkylated, then acylated linear polymer of a 1,2-alkyleneimine, said polymer having a molecular weight of at least 800, each alkylene unit therein having 2–20 carbon atoms, formed by reacting, at a temperature of from about 100° C. to about 250° C., said polymer with a hydrocarbon halide alkylating agent having 1–30 carbon atoms, and then reacting said alkylated polymer, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction,
(10) an acylated, then alkylated linear polymer of a 1,2-alkyleneimine, said polymer having a molecular weight of at least 800, each alkylene unit therein having 2–20 carbon atoms, formed by reacting, at a temperature of from about 120° C. to about 300° C., said polymer with an acylating agent selected from the group cosnisting of (i) a carboxylic acid having 7–39 carbon atoms and (ii) a precursor of said carboxylic acid capable of forming said acid in said reaction, and then reacting said acylated polymer, at a temperature of from about 100° C. to about 250° C., with a hydrocarbon halide alkylating agent having 1–30 carbon atoms,
(11) an oxyalkylated, then alkylated linear polymer of a 1,2-alkyleneimine, said polymer having a molecular weight of at least 800, each alkylene unit therein having 2–20 carbon atoms, formed by reacting, at a temperature of from about 80° C. to about 200° C. and a pressure of from about 10 p.s.i. to about 200 p.s.i., said polymer with an alkylene oxide having 2–8 carbon atoms, and then reacting said oxyalkylated polymer, at a temperature of from about 100° C. to about 250° C., with a hydrocarbon halide alkylating agent having 1–30 carbon atoms,
(12) a Schiff base reaction product of an acylated linear polymer of a 1,2-alkyleneimine, said polymer having a molecular weight of at least 800, each alkylene unit therein having 2–20 carbon atoms, formed by reacting, at a temperature of from about 120° C. to about 300° C., said polymer with an acylating agent selected from the group consisting of (i) a carboxylic acid having 7–39 carbon atoms and (ii) a precursor of said carboxylic acid capable of forming said acid in said reaction, and then reacting said acylated polymer with a compound selected from the group consisting of aldehydes and ketones,
(13) a Schiff base reaction product of an alkylated linear polymer of a 1,2-alkyleneimine, said polymer having a molecular weight of at least 800, each alkylene unit therein having 2–20 carbon atoms, formed by reacting, at a temperature of from about 100° C. to about 250° C., said polymer with a hydrocarbon halide alkylating agent having 1–30 carbon atoms, and then reacting said alkylated polymer with a compound selected from the group consisting of aldehydes and ketones,
(14) an oxyalkylated Schiff base reaction product of a linear polymer of a 1,2-alkyleneimine, said linear polymer having a molecular weight of at least 800, each alkylene unit therein having 2–20 carbon atoms formed by reacting said linear polymer with a compound selected from the group consisting of aldehydes and ketones to form said Schiff base reaction product and then reacting said Schiff base reaction product, at a temperature of from about 80° C. to about 200° C. and a pressure of from about 10 p.s.i. to about 200 p.s.i., with an alkylene oxide having 2–8 carbon atoms,
(15) an acylated, then olefinated linear polymer of a 1,2-alkyleneimine, said polymer having a molecular weight of at least 800, each alkylene unit therein having 2–20 carbon atoms, formed by reacting, at a temperature of from about 120° C. to about 300° C., said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 70° C. to about 100° C., with an olefinating agent selected from the group consisting of acrylonitrile, styrene, butadiene, vinyl ethers and vinyl sulfones, and
(16) an alkylated, then olefinated linear polymer of a 1,2-alkyleneimine, said polymer having a molecular weight of at least 800, each alkylene unit therein having 2–20 carbon atoms, formed by reacting, at a temperature of from about 100° C. to about 250° C., said polymer with a hydrocarbon halide alkylating agent having from 1–30 carbon atoms, and then reacting said alkylated polymer, at a temperature of from about 70° C. to about 100° C., with an olefinating agent selected from the group consisting of acrylonitrile, styrene, butadiene, vinyl ethers and vinyl sulfones.

26. The cutting oil composition of claim 25 wherein the compound is a linear polymer of a 1,2-alkyleneimine, said polymer having a molecular weight of at least 800, each alkylene unit having 2 to 20 carbon atoms.

27. The cutting oil composition of claim 25 wherein the compound is an acylated linear polymer of a 1,2-alkyleneimine, said polymer having a molecular weight of at least 800, each alkylene unit having 2 to 20 carbon atoms, formed by reacting, at a temperature of from about 120° C. to about 300° C., said linear polymer with an acylating agent, said acylating agent having 7–39 carbon atoms and being selected from the group consisting of aliphatic carboxylic acids, aromatic polycarboxylic acids, and precursors thereof each capable of forming said acid in said reaction.

28. The cutting oil composition of claim 25 wherein the compound is an oil-soluble oxyalkylated linear polymer of a 1,2-alkyleneimine, said polymer having a molecular weight of at least 800, each alkylene unit having 2 to 20 carbon atoms, formed by reacting at a temperature of from about 80° C. to about 200° C. and a pressure of from about 10 p.s.i. to about 200 p.s.i., said polymer with an alkylene oxide having 2–8 carbon atoms.

29. The cutting oil composition of claim 25 wherein the compound is an alkylated linear polymer of a 1,2-alkyleneimine, said polymer having a molecular weight of at least 800, each alkylene unit having 2 to 20 carbon atoms, formed by reacting at a temperature of from about 100° C. to about 250° C., said polymer with a hydrocarbon halide alkylating agent having 1–30 carbon atoms.

30. The cutting oil composition of claim 25 wherein the compound is an olefinated linear polymer of a 1,2-alkyleneimine, said polymer having a molecular weight of at least 800, each alkylene unit having 2 to 20 carbon atoms, formed by reacting at a temperature of from about 70° C. to about 100° C., said polymer with an olefinating agent selected from the group consisting of acrylonitrile, styrene, butadiene, vinyl ethers, and vinyl sulfones.

31. The cutting oil composition of claim 25 wherein the compound is a carbonylated Schiff base reaction product linear polymer of a 1,2-alkyleneimine, said polymer having a molecular weight of at least 800, each alkylene unit having 2 to 20 carbon atoms, formed by reacting said polymer with a compound selected from the group consisting of aldehydes and ketones.

32. The cutting oil composition of claim 25 wherein the compound is an acylated, then oxyalkylated linear polymer of a 1,2-alkyleneimine, said polymer having a molecular weight of at least 800, each alkylene unit having 2–20 carbon atoms, formed by reacting at a temperature of from about 125° C. to about 300° C. said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 80° C. to about 200° C. and a pressure of from about 10 p.s.i. to about 200 p.s.i., with an alkylene oxide having 2–8 carbon atoms.

References Cited by the Examiner

UNITED STATES PATENTS

| | | | |
|---|---|---|---|
| 2,182,306 | 12/1939 | Ulrich et al. | 260—2 X |
| 2,272,489 | 2/1942 | Ulrich | 260—2 X |
| 2,296,225 | 9/1942 | Ulrich | 260—2 X |
| 2,530,650 | 11/1950 | Chenicek | 252—51.5 X |
| 2,626,931 | 1/1953 | Bestian. | |
| 2,628,941 | 2/1953 | Adelson et al. | 252—47.5 X |
| 2,892,871 | 6/1959 | Filbey et al. | 252—51.5 X |
| 3,189,546 | 6/1965 | Vander Voort | 252—51.5 X |
| 3,267,034 | 8/1966 | Vander Voort | 252—34 |

FOREIGN PATENTS

| | | |
|---|---|---|
| 488,553 | 7/1938 | Great Britain. |
| 834,883 | 5/1960 | Great Britain. |

DANIEL E. WYMAN, *Primary Examiner.*

JULIUS GREENWALD, ALPHONSO D. SULLIVAN, JIM BAILEY, *Examiners.*

P. C. BAKER, R. E. HUTZ, P. P. GARVIN,
*Assistant Examiners.*